United States Patent
Lin

(10) Patent No.: US 7,072,193 B2
(45) Date of Patent: Jul. 4, 2006

(54) INTEGRATED CHARGE PUMP DC/DC CONVERSION CIRCUITS USING THIN FILM TRANSISTORS

(75) Inventor: Ching-Wei Lin, Taoyuan (TW)

(73) Assignee: Toppoly Optoelectronics Corp., Chu-Nan (TW)

( * ) Notice: Subject to any disclaimer, the term of this patent is extended or adjusted under 35 U.S.C. 154(b) by 175 days.

(21) Appl. No.: 10/850,320

(22) Filed: May 19, 2004

(65) Prior Publication Data

US 2005/0258810 A1  Nov. 24, 2005

(51) Int. Cl.
*H02M 3/18* (2006.01)
(52) U.S. Cl. ...................................................... 363/59
(58) Field of Classification Search .................. 363/59, 363/60; 327/536
See application file for complete search history.

(56) References Cited

U.S. PATENT DOCUMENTS 6,373,326 B1 * 4/2002 Tomari ........................ 327/536
6,738,271 B1 * 5/2004 Umeda ......................... 363/60

* cited by examiner

*Primary Examiner*—Adolf Berhane
(74) *Attorney, Agent, or Firm*—Liu & Liu

(57) ABSTRACT

A DC/DC conversion circuit for a display panel. The DC/DC conversion circuit converts an input voltage into a boosted voltage, in which first and second charge pump circuits are coupled to first and second clock signals respectively and output a boosted voltage to a load alternately. Under the control of the first and second clock signals, the first charge pump circuit outputs a first signal to disable the output of the second charge pump circuit or the second charge pump circuit output a second signal to disable the output of the first charge pump circuit.

23 Claims, 24 Drawing Sheets

INTEGRATED CHARGE PUMP DC/DC CONVERSION CIRCUITS USING THIN FILM TRANSISTORS

BACKGROUND OF THE INVENTION

1. Field of the Invention

The present invention relates to a kind of charge pump circuit, and more particularly, relates to an integrated charge pump circuit using thin film transistors.

2. Description of the Related Art

In display circuit integrations, DC—DC converters can be integrated into display panels to lower the required supply voltages of system interface control ICs, such that fabrication cost of the control ICs is reduced. For example, fabrication costs and time-to-market of display module can be reduced greatly, by forming driving circuits by thin film transistors (TFTs) and integration into display panels. However, poor TFT characteristics, such as high threshold voltage (Vt) and low mobility, result in lower power efficiency of the DC—DC converters compared to MOSFETs.

Conventional DC—DC converters are classified as switching regulators and charge pump circuits. Charge pump circuits are more suitable for integration than switching regulators because typical switching regulators are RLC circuits, producing harmonic noise. Charge pump circuits can also be divided into Dickson types, as shown in FIGS. 1a and 1b, and switched-capacitor types. However, due to higher threshold voltage (Vt) of TFTs, the Dickson type charge pump circuits have a great transistor switching loss, reducing entire conversion efficiency thereof. Modified Dickson type charge circuits are proposed to improve power conversion efficiency, but are complicated to drive.

FIG. 2 shows a conventional charge pump circuit 10, however, an extra voltage boost circuit 12 is required to provide boosted clock signals to promote gate drive capability of TFTs in the charge pump circuit 14, preventing charge backflow. In the voltage boost circuit 12, for example, a level shifter is required to produce the boosted clock signals according to clock signals and the output voltage Vout from charge pump circuit 14. Consequently, circuit complexity is increased and entire power conversion efficiency is still poor due to the extra voltage boost circuit.

SUMMARY OF THE INVENTION

It is therefore an object of the present invention to reduce power consumption of a charge pump DC/DC conversion circuit and improve power conversion efficiency. The present invention provides a charge pump DC/DC conversion circuit having at least two coupled charge pumps (e.g., including thin film transistors). The charge pumps are controlled to alternately produce a boosted voltage output, e.g. to a LCD display panel. In another aspect, the output of one charge pump is directed to the other charge pump, so as to disable the other charge pump to effect alternate output by the two charge pumps, wherein a control signal (e.g., one or more clock signals) controls the timing of the outputs of the charge pumps.

In one embodiment of the DC/DC conversion circuit, the conversion circuit inverts an input voltage to an output for output to a load, such as LCD display panel. In the conversion circuit, first and second charge pump circuits are connected in parallel and alternatively output first and second boosted voltages as the output the conversion circuit according to a control signal. In another aspect, the first and second charge pump circuits produces first and second signals respectively, according to the control signal. The first signal is operatively coupled to the second charge pump circuit, and the second control is operatively coupled to the first charge pump circuit. The first signal disables output of the second charge pump circuit or the second signal disables output of the first charge pump circuit under control of the control signal.

BRIEF DESCRIPTION OF THE DRAWINGS

The present invention can be more fully understood by the subsequent detailed description and examples with reference made to the accompanying drawings, wherein.

DETAILED DESCRIPTION OF THE INVENTION

Figure 1A:
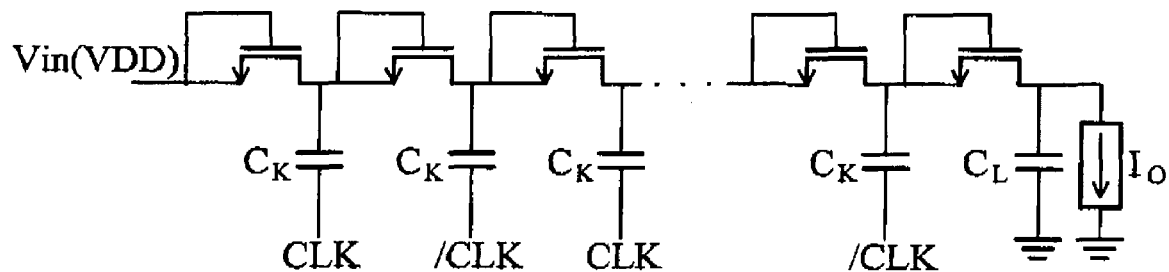
FIGS. 1a and 1b show conventional Dickson type charge pump circuits.
Figure 1B:
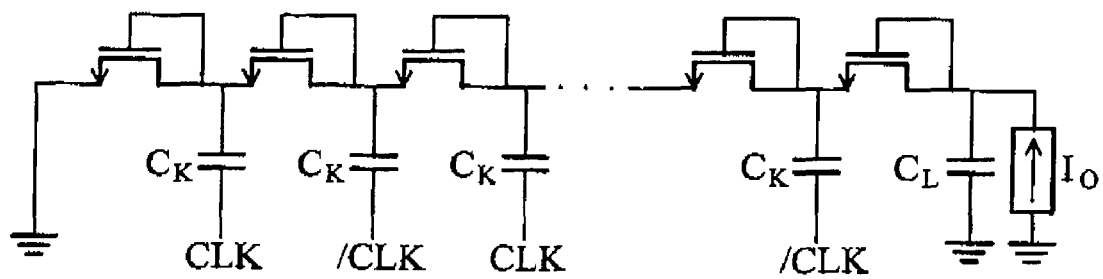
Figure 2:
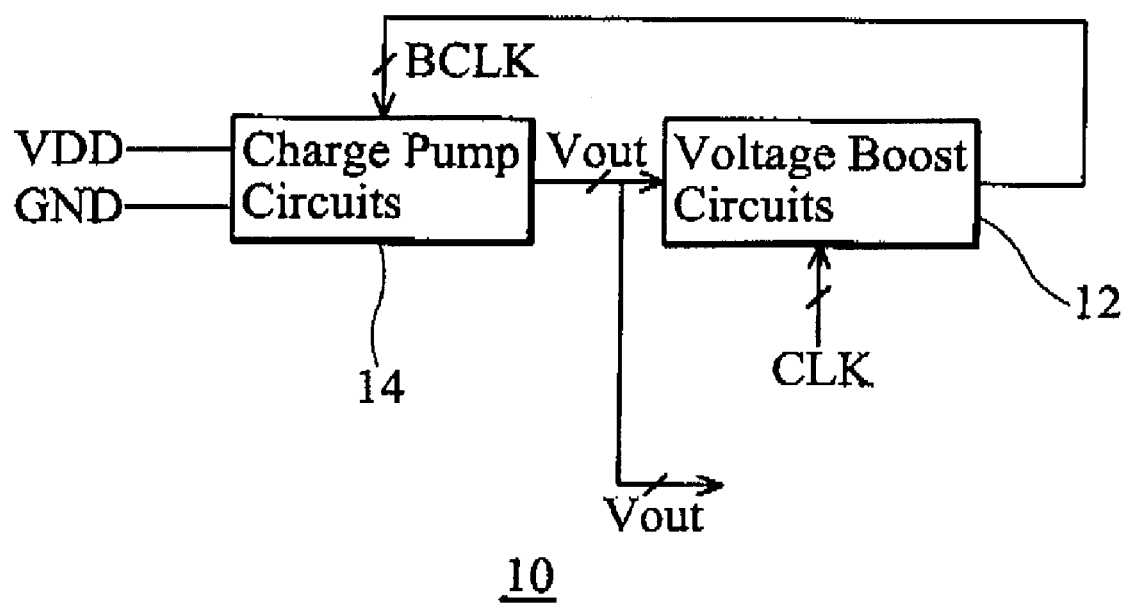
FIG. 2 shows a conventional charge pump circuit.
Figure 3A:
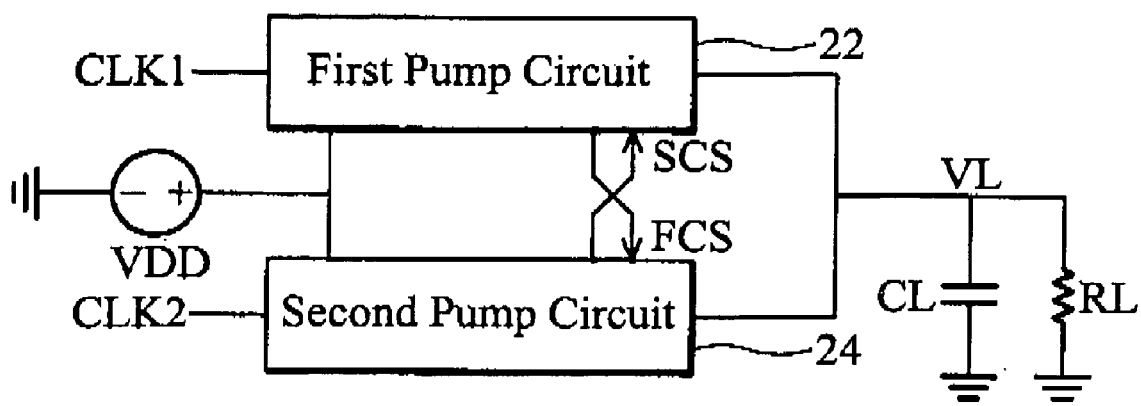
FIG. 3a is a diagram of a DC/DC conversion circuit according to the present invention.

FIG. 3a is a schematic diagram of a DC/DC conversion circuit according to the present invention. The DC/DC conversion circuit 20 comprises a first charge pump circuit 22 and a second charge pump circuit 24 connected in parallel. The DC/DC conversion circuit 20 inverts an input voltage to an output voltage for output to a load, such as LCD display panel. According to the control signal (CLK1 and CLK2), the first charge pump circuit 22 converts the input voltage VDD to a first boosted voltage, and produces a first signal (FCS) to output to the second charge pump circuit 24. According to the control signal (CLK1 and CLK2), the second charge pump circuit 24 converts the input voltage VDD to a second boosted voltage, and produces a second signal (SCS) to output to the first charge pump circuit 22. The first and second charge pump circuits alternatively output the first and second boosted voltages as the output of the DC/DC conversion circuit 20, according to the control signal (CLK1 and CLK2). Under the control of the control signal, the first signal FCS disables output of the second charge pump circuit 24 or the second signal SCS disables output of the first charge pump circuit 22. In the present invention, the first and second charge pump circuit 22 and 24 can be controlled by boosted voltage signal output from the other, such that no extra boosted voltage circuit is required in the DC/DC conversion circuit.

FIRST EMBODIMENT

Figure 4A:
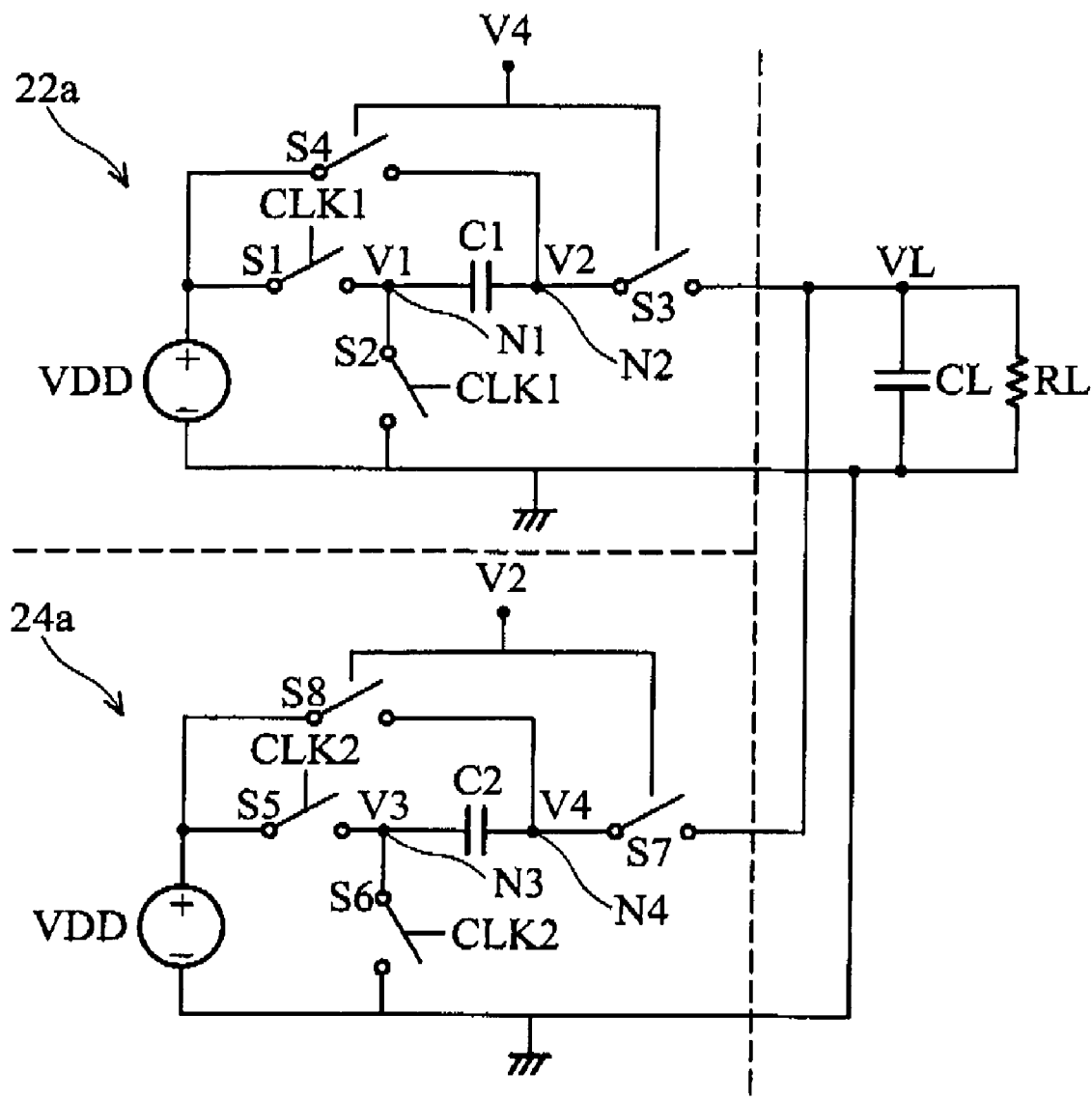
FIG. 4a is a schematic diagram of the DC/DC converter according to a first embodiment of the present invention.

FIG. 4a is a schematic diagram of a first embodiment according to the present invention. As shown in FIG. 4a, the DC/DC conversion circuit 20a comprises a first charge pump circuit 22a and a second charge pump circuit 24a connected in parallel. Under the control of the control signal (CLK1 and CLK2), the first and second charge pump circuits 22a and 24a output an output voltage to a load (capacitor CL and resistor RL), such as LCD display panel. In the first charge pump circuit 22a, the switching element S1 is coupled between the input voltage VDD and the node N1, and the switching element S2 is coupled between the node N1 and ground. The capacitor C1 is coupled between the nodes N1 and N2, the switching element S3 is coupled between the node N2 and the load (RL and CL), and the switching element S4 is coupled between the input voltage VDD and the node N2. In the second charge pump circuit 24a, the switching element S5 is coupled between the input voltage VDD and the node N3, and the switching element S6 is coupled between the node N3 and ground. The capacitor C2 is coupled between the nodes N3 and N4, the switching element S7 is coupled between the node N4 and the load (RL and CL), and the switching element S8 is coupled between the input voltage VDD and the node N4.

Figure 3B:
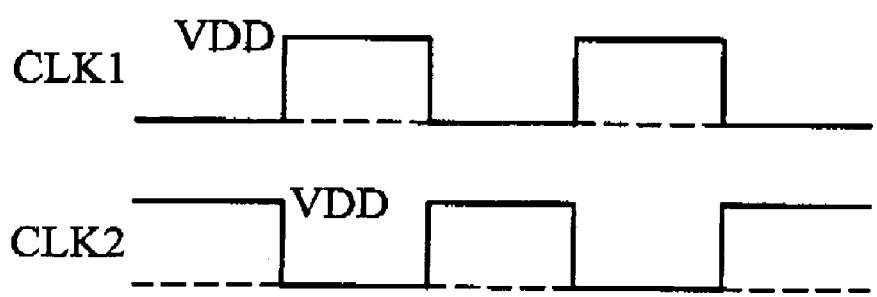
FIG. 3b is a waveform diagram showing the first and second clock signals according to the present invention.

The control terminals of the switching elements S1 and S2 are coupled to a clock signal CLK1 (as shown in FIG. 3b), and the control terminals of the switching elements S5 and S6 are coupled to a clock signal CLK2 (as shown in FIG. 3b). In this embodiment, the voltage V4 at the node N4, as a first signal, is coupled to the control terminals of the switching elements S3 and S4. The voltage V2 at the node N2, as a second signal, is coupled to the control terminals of the switching elements S7 and S8. Under the control of the control signal, the first signal (voltage V2) disables output of the second charge pump circuit 24a or the second signal (voltage V4) disables output of the first charge pump circuit 22a. In this embodiment, the switching elements S1~S8 can be TFTs.

Figure 4B:
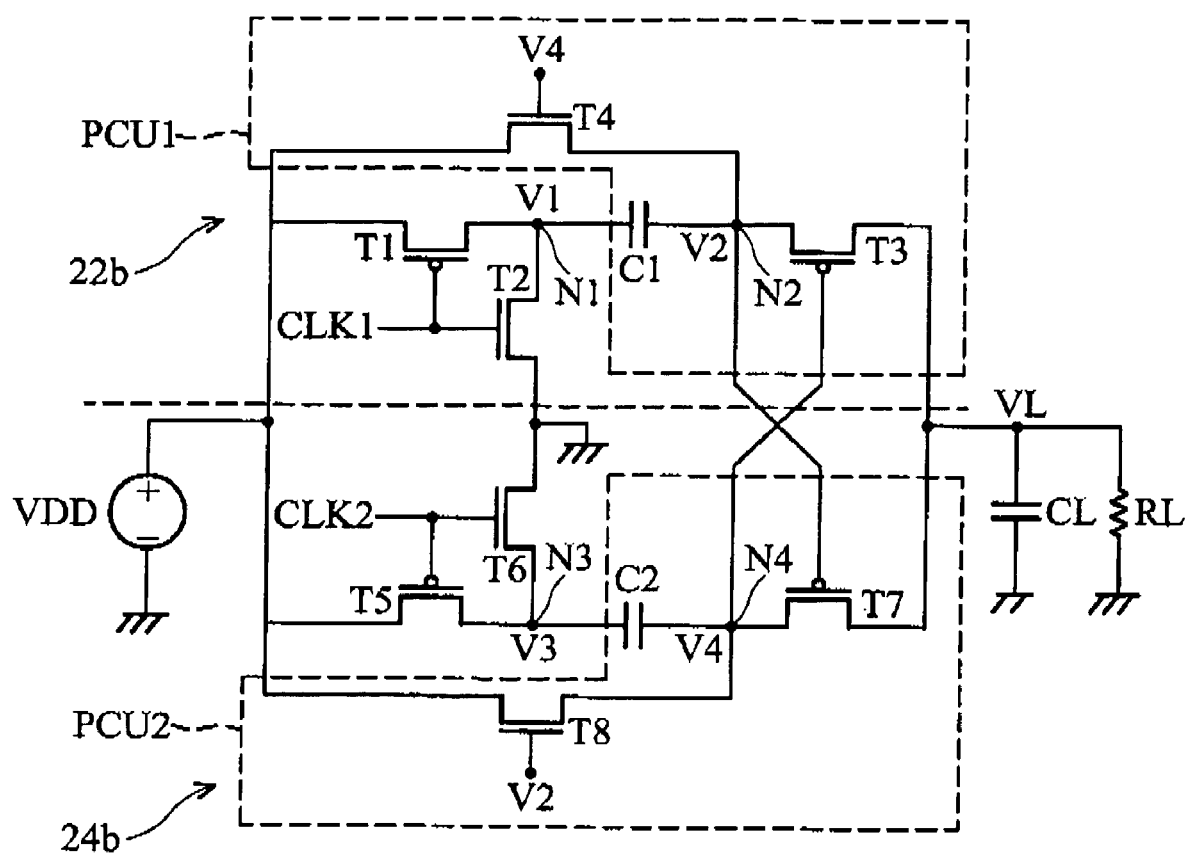
FIG. 4b is a circuit diagram of the DC/DC converter according to the first embodiment of the present invention.
Figure 4C:
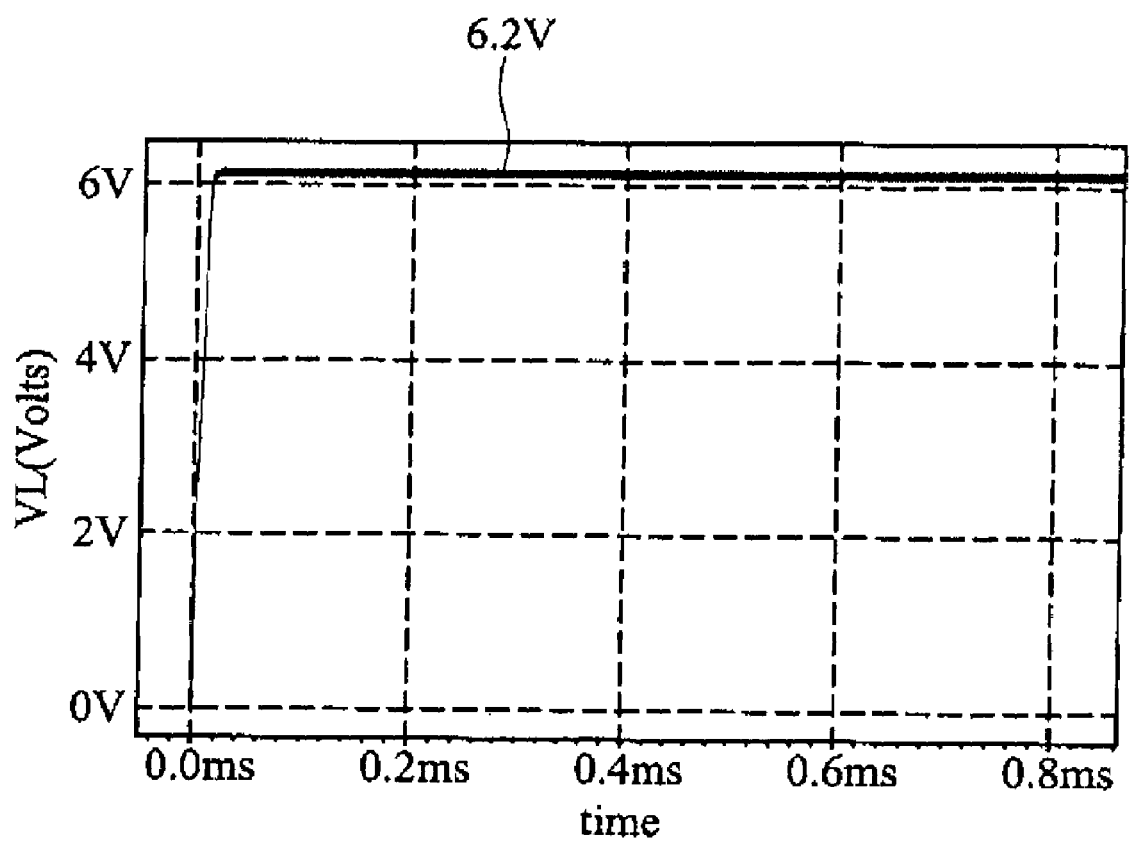
FIG. 4c is an output waveform diagram of the DC/DC converter according to the first embodiment of the present invention.
Figure 4D:
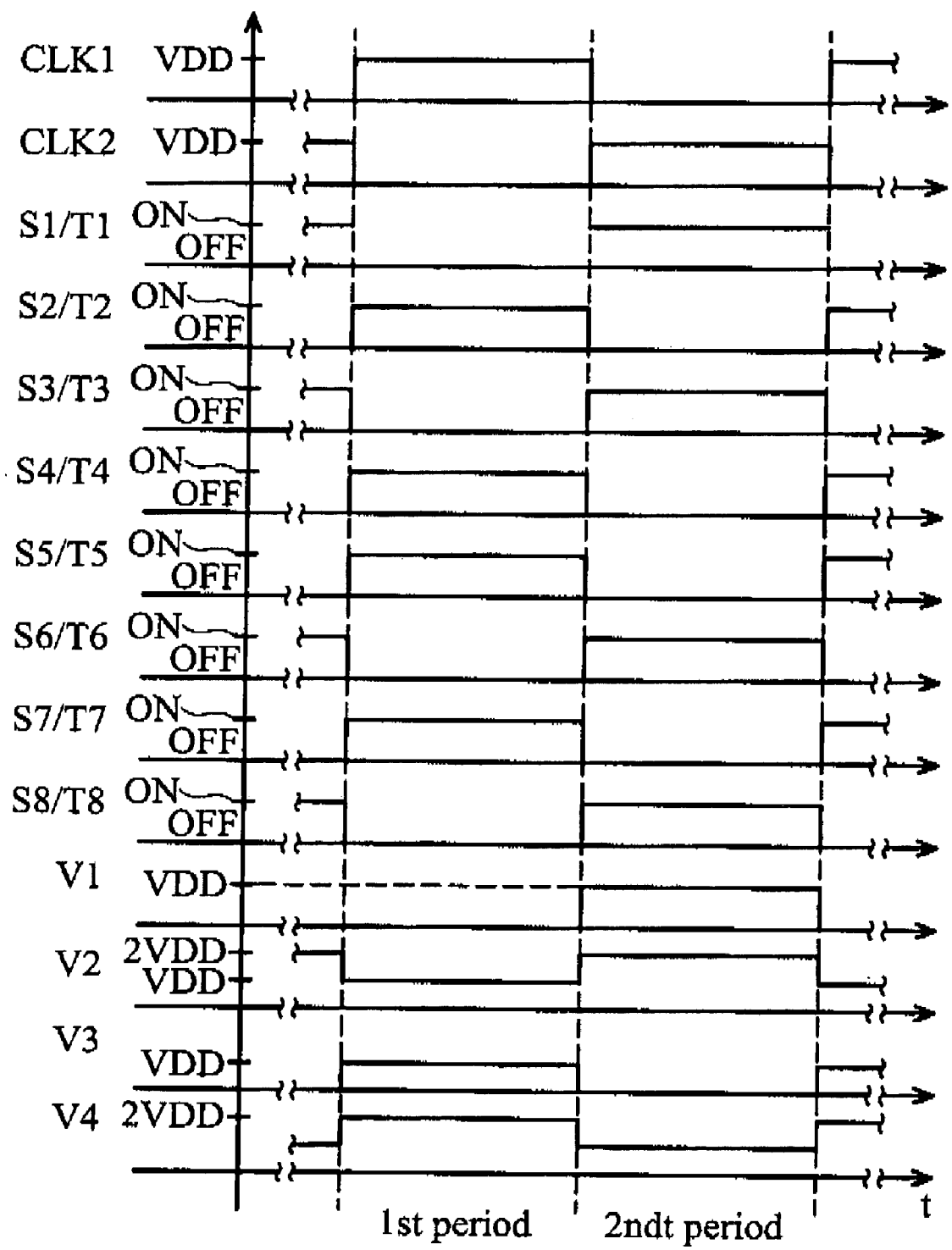
FIG. 4d is a timing diagram of the DC/DC converter according to the first embodiment of the present invention.

Operation of the DC/DC conversion circuit 20a is described, with reference to FIG. 4a and FIG. 4d. During a first period, in the DC/DC conversion circuit 20a, the switching elements S2, S4, S5 and S7 are designed to turn on, and the switching elements S1, S3, S6 and SB are designed to turn off according to the clock signals CLK1 and CLK2 and the first signal (V2) and the second signal (V4). In the first charge pump circuit 22a, the input voltage VDD is stored in the capacitor C1 by the switching elements S2 and S4 turning on and the switching elements S1 and S3 off. In addition, in the second charge pump circuit 24a, a second boosted voltage (2VDD), as output voltage VL is output to the load (CL and RL) by the input voltage VDD and the voltage stored on the capacitor C2, by the switching elements S5 and S7 turning on and the switching elements S6 and S8 off.

During a second period, in the DC/DC conversion circuit 20a, the switching elements S2, S4, S5 and S7 are designed to turn off, and the switching elements S1, S3, S6 and S8 on according to the clock signals CLK1 and CLK2 and the first signal (V2) and the second signal (V4). In the first charge pump circuit 22a, a second boosted voltage (2VDD), as output voltage VL is output to the load (CL and RL) by the input voltage VDD and the voltage stored on the capacitor C1 by the switching elements S1 and S3 turning on and the switching elements S2 and S4 off. In addition, in the second charge pump circuit 24a, the input voltage VDD is stored in the capacitor C2 by the switching elements S6 and S8 turning on and the switching elements S5 and S7 off. Namely, in the DC/DC conversion circuit 20a, the first and second charge pump circuits 22a and 24a alternately output a voltage of 2VDD as an output voltage to the load (CL and RL). Therefore, the DC/DC conversion circuit 20a converts the input voltage VDD to a boosted voltage VL of 2VDD.

Namely, in the DC/DC conversion circuit 20a, the first and second charge pump circuits 22a and 24a alternately output a boosted voltage of 2VDD as an output voltage VL to the load (CL and RL). Thus, the DC/DC conversion circuit 20a converts the input voltage VDD to a boosted voltage VL of 2VDD. Further, under the control of the control signal (CLK1 and CLK2), the first signal (V2) disables output of the second charge pump circuit 24a or the second signal (V4) disables output of the first charge pump circuit 22a.

FIG. 4b is a circuit diagram of the first embodiment according to the present invention. As shown in FIG. 4b, the DC/DC conversion circuit 20b has a first charge pump circuit 22b and a second charge pump circuit 24b connected in parallel. Under the control of the control signal (CLK1 and CLK2), the first and second charge pump circuits 22b and 24b output an output voltage to a load (capacitor CL and resistor RL), such as LCD display panel. The first and second charge pump circuits 22b and 24b are coupled to clock signals CLK1 and CLK2 respectively and output an output boosted voltage to the load (RL and CL) alternately. Further, under the control of the control signal (CLK1 and CLK2), the first signal (voltage V2) disables output of the second charge pump circuit 24b or the second signal (voltage V4) disables output of the first charge pump circuit 22b.

As shown in FIG. 4b, the charge pump circuit 22b comprises the transistors T1 and T2 and a primary charge pump unit PCU1. The control terminals of the transistors T1 and T2 are coupled to the clock signal CLK1. A primary charge pump unit PCU1 is coupled to the node 1 and the load (RL and CL). In the primary charge pump unit PCU1, the capacitor C1 is coupled between the nodes N1 and N2. The transistor T3 is coupled between the node N2 and the capacitor CL, and the transistor T4 is coupled between the input voltage VDD and the node N2.

The charge pump circuit 24b comprises transistors T5 and T6 and a primary charge pump unit PCU2. The control terminals of the transistors T5 and T6 are coupled the clock signal CLK2. A primary charge pump unit PCU2 is coupled to the node 3 and the capacitor CL. In the primary charge pump unit PCU2, the capacitor C2 is coupled between the nodes N3 and N4. The transistor T7 is coupled between the node N4 and the capacitor CL, and the transistor T8 is coupled between the input voltage VDD and the node N4. The control terminals of the transistors T3 and T4 are coupled to the node 4, and the control terminals of the transistors T7 and T8 are coupled to the node 2. The voltage V2 at the node N2 serves as a first signal, and the voltage V4 at the node N4 serves as a second signal. The transistor T1~T5 correspond to the switching devices S1~S8 shown in FIG. 4a.

Operation of the DC/DC conversion circuit 20b is described, with reference to FIG. 4b and FIG. 4d. During a first period, the clock signals CLK1 and CLK2 are high and low respectively. The transistors T1 and T6 are turned off and transistor T2 and T5 are turned on, such that voltage V1 at node 1 is grounded, the voltage V2 at the node N2 is VDD, the voltage V3 at the node N3 is VDD and the voltage V4 at the node N4 is 2VDD. Because the voltage V2 is VDD and the voltage V4 is 2VDD, the transistors T4 and T7 are turned on and transistors T3 and TB turned off, such that the voltage V4 of 2VDD acts as a boosted voltage VL output to the load (CL and RL), and output of the first charge pump circuit 22b is disabled by the second signal (voltage V4).

During a second period, the clock signals CLK1 and CLK2 are low and high respectively. The transistors T2 and T5 are turned off and transistor T1 and T6 are turned on, such that the voltage V1 at the node N1 is VDD, the voltage V2 at the node N2 is 2VDD, the voltage V3 at node 3 is grounded, and the voltage V4 at the node N4 is VDD. Because the voltage V4 is VDD and the voltage V2 is 2VDD, the transistors T3 and T8 are turned on and transistors T4 and T7 are turned off, such that the voltage V2 of 2VDD acts as a boosted voltage VL output to the load (RL and CL), the output of the second charge pump circuit 24b is disabled by the first signal (voltage V2).

Thus, in the DC/DC conversion circuit 20b, the first and second charge pump circuits 22b and 24b alternately output a voltage of 2VDD as a boosted voltage VL to the load (RL and CL), and the first and second charge pump circuits 22b and 24b can be disabled by the first and second signals alternately. Namely, the DC/DC conversion circuit 20b, as a voltage doubler, converts the input voltage VDD into a boosted voltage VL of 2VDD. FIG. 4c shows an output waveform of the DC/DC conversion circuit 20b, wherein the input voltage VDD is 3.3V, and the boosted voltage VL is about 6.2V.

SECOND EMBODIMENT

Figure 5A:
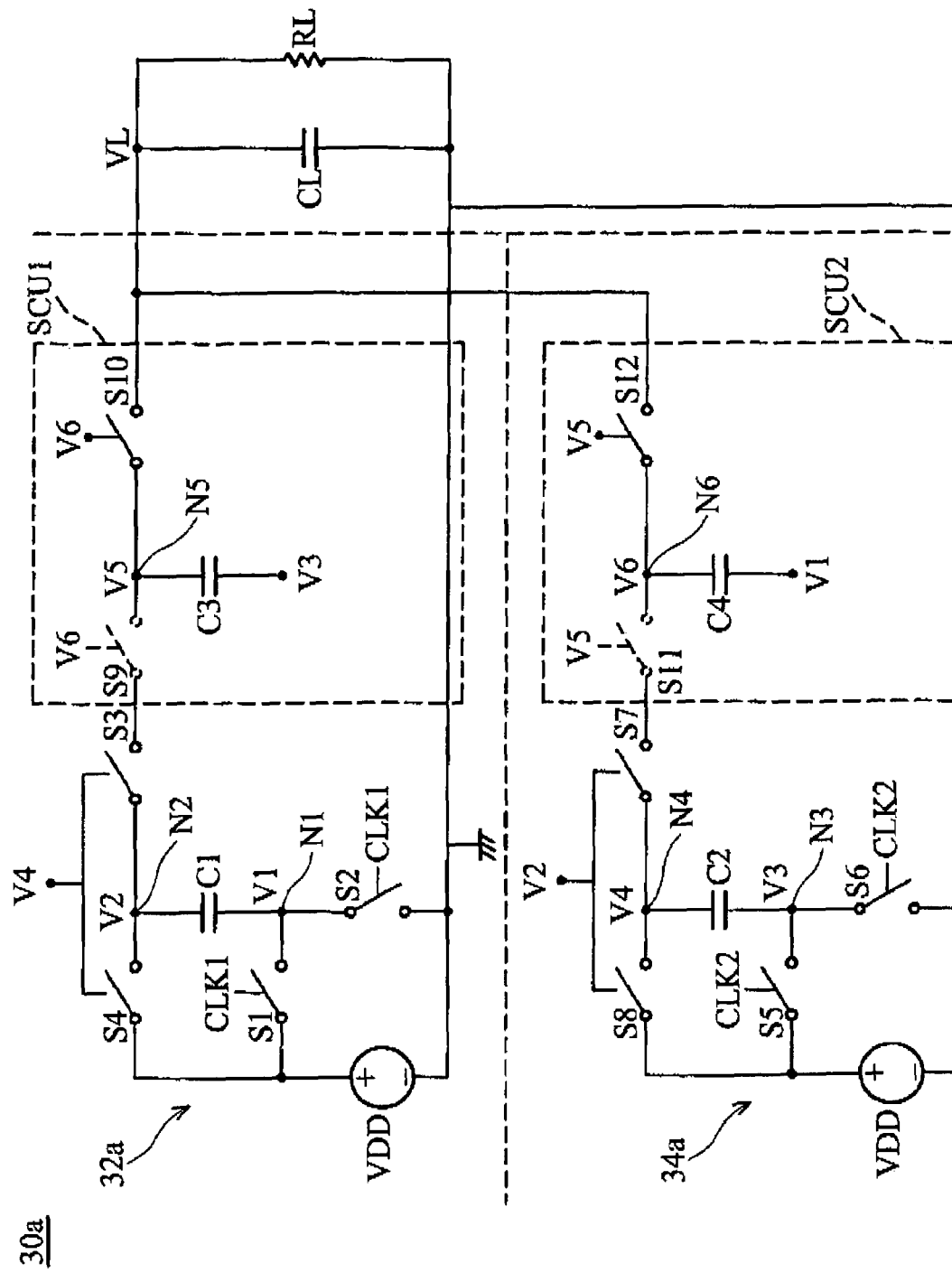
FIG. 5a is a schematic diagram of the DC/DC converter according to a second embodiment of the present invention.

FIG. 5a is a schematically diagram of a second embodiment according to the present invention. As shown in FIG. 5a, the DC/DC conversion circuit 30a comprises a first charge pump circuit 32a and a second charge pump circuit 34a connected in parallel.

In the DC/DC conversion circuit 30a, the first charge pump circuit 32a is similar to the charge pump circuit 22a shown in FIG. 4a except for the addition of a secondary charge pump unit SCU1, and the second charge pump circuit 34b is similar to the charge pump circuit 24a as shown in FIG. 4a except for the addition of a secondary charge pump unit SCU2. The additional charge pump unit SCU is coupled in tandem to the primary charge pump unit PCU. For brevity, description of like structures is omitted.

In the secondary charge pump unit SCU1, the switching element S9 is coupled between the switching device S3 and the node N5, and the switching element S10 is coupled between the node N5 and the load (RL and CL). The capacitor C3 is coupled between the nodes N5 and the voltage V3 at the node N3 in the second charge pump circuit 34a. In the secondary charge pump unit SCU2, the switching element S11 is coupled between the switching device S7 and the node N6, and the switching element S12 is coupled between the node N6 and the load (RL and CL). The capacitor C4 is coupled between the nodes N6 and the voltage V1 at the node N1 in the first charge pump circuit 32a.

The control terminals of the switching elements S9 and S10 are coupled to the voltage V6 at the node N6 in the second charge pump circuit 34a, and the control terminals of the switching elements S11 and S12 are coupled to the voltage V5 at the node N5 in the first charge pump circuit 32a. In this embodiment, the voltage V2 at the node N2 and the voltage V5 at the node N5, as the first signal, are coupled to the second charge pump circuit 34a, and the voltage V4 at the node N4 and the voltage V6 at the node N6, as second signal, are coupled to the first charge pump circuit 32a. The switching devices S9 and S11 are optional, wherein the switching device S9 is designed to turn on when the switching device S10 turns off and to turn off when the switching device S10 turns on. The switching device S11 is designed to turn on when the switching device S12 turns off and to turn off when the switching device S12 turns on.

Operation of the DC/DC conversion circuit 30a is described as follows, with reference to FIGS. 5a and 5d.

During a first period, in the DC/DC conversion circuit 30a, the switching elements S2, S4, S5, S7, S10 and S11 are designed to turn on, and the switching elements S1, S3, S6, S8, S9 and S12 are designed to turn off according to the clock signals CLK1 and CLK2 and the first signal including voltages V2 and V5 and the second signal including voltages V4 and V6.

In the first charge pump circuit 32a, the voltage VDD is stored in the capacitor C1 by the switching elements S1 and S3 turning off and the switching elements S2 and S4 on. A first boosted voltage of 3VDD produced by the input voltage VDD and the voltage stored in the capacitor C3 (2VDD) is output to the load (CL and RL) by the switching elements S10 turning on. In the second charge pump circuit 34a, 2VDD is stored in the capacitor C4 by the input voltage VDD and the voltage stored in the capacitor C2 (VDD) by the switching elements S5, S7 and S11 turning on and the switching elements S6, S8, and S12 off.

During a second period, in the DC/DC conversion circuit 20a, the switching elements S2, S4, S5, S7, S10 and S11 are designed to turn off, and the switching elements S1, S3, S6, S8, S9 and S12 are designed to turn on according to the clock signals CLK1 and CLK2 and the first signal including voltages V2 and V5 and the second signal including voltages V4 and V6.

In the first charge pump circuit 32a, the 2VDD is stored in the capacitor C3 by the input voltage VDD and the voltage stored on the capacitor C1 (VDD) by the switching elements S1 and S3 turning on and the switching elements S2 and S4 off. In the second charge pump circuit 24a, the input voltage VDD is stored in the capacitor C2 by the switching elements S6 and S8 turning on and the switching elements S5 and S7 off. In addition, a second boosted voltage of 3VDD produced by the input voltage VDD and the voltage stored on the capacitor C4 (2VDD) is output to the load (RL and CL) by the switching element S12 turning on. Namely, in the DC/DC conversion circuit 30a, the first and second charge pump circuits 32a and 34a alternately output a boosted voltage of 3VDD as an output voltage VL to the load (CL and RL). Thus, the DC/DC conversion circuit 30a converts the input voltage VDD to a boosted voltage VL of 3VDD. Further, under the control of the control signal (CLK1 and CLK2), the first signal (V2 and V5) disables output of the second charge pump circuit 34a or the second signal (V4 and V6) disables output of the first charge pump circuit 32a.

Figure 5B:
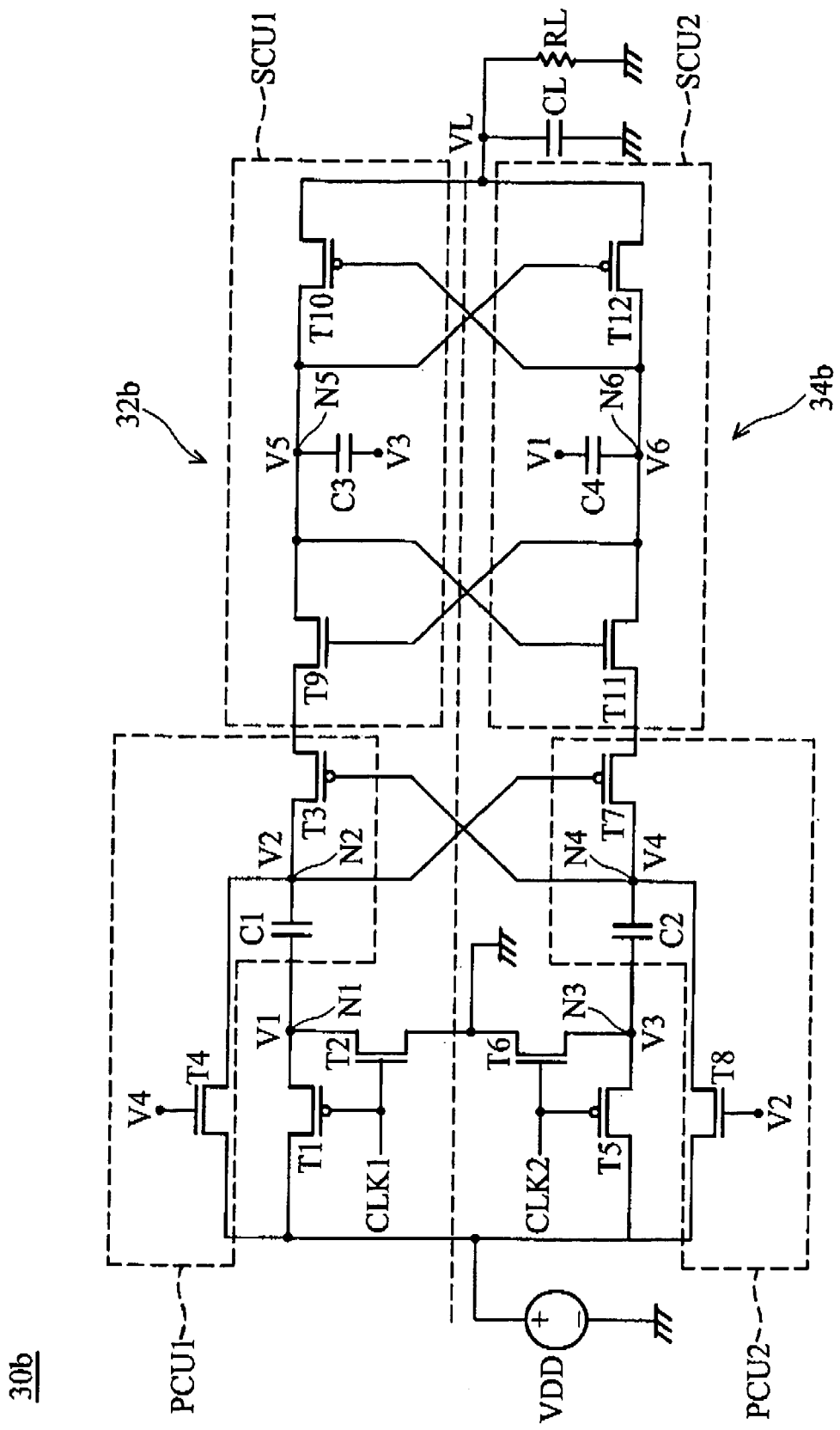
FIG. 5b, is a circuit diagram of the DC/DC converter according to the second embodiment of the present invention.

FIG. 5b is a circuit diagram of the second embodiment according to the present invention. As shown in FIG. 5b, the DC/DC conversion circuit 30b comprises a first charge pump circuit 32b and a second charge pump circuit 34b connected in parallel and coupled between a first input voltage VDD and a load (RL and CL). The first and second charge pump circuits 32b and 34b are coupled to first and second clock signals CLK1 and CLK2 respectively and output a boosted voltage VL to the load alternately.

As shown in FIG. 5b, the first charge pump circuit 32b is similar to the charge pump circuit 22b shown in FIG. 4b expect for addition of the secondary charge pump unit SCU1 coupled between the charge pump unit PCU1 and the load (RL and CL). The second charge pump circuit 34b is similar to the charge pump circuit 24b shown in FIG. 4b except for addition of the secondary charge pump unit SCU2 coupled between the charge pump unit PCU2 and the load (RL and CL). For brevity, description of like structures is omitted.

The secondary pump unit SCU1 comprises two transistors T9 and T10 and a capacitor C3. The transistor T9 is coupled between the transistor T3 and the node N5, the transistor T10 is coupled between the node N5 and the load (RL and CL), and the capacitor C3 is coupled between the node N5 and voltage V3. The secondary pump unit SCU2 comprises two transistors T11 and T12 and a capacitor C4. The transistor T11 is coupled between the transistor T7 and the node N6, the transistor T12 is coupled between the node N6 and the load (FL and CL), and the capacitor C4 is coupled between the node N6 and voltage V1. The transistor T1~T12 correspond to the switching devices S1~S12 shown in FIG. 5a.

Operation of the DC/DC conversion circuit 30b is described as follows, with reference to FIGS. 5b and 5d.

During a first period, the first and second clock signals CLK1 and CLK2 are high and low respectively. The transistors T1 and T6 are turned off and transistors T2 and T5 are turned on, such that voltage V1 at node 1 is grounded, voltage V2 at the node N2 is VDD, voltage V3 at the node N3 is VDD and voltage V4 at the node N4 is 2VDD. Because the voltage V2 is VDD and the voltage V4 is 2VDD, the transistors T4 and T7 are turned on and transistors T3 and TB are turned off.

The voltage V5 at the node N5 can be 3VDD due to the voltage V3 of VDD at the node N3 and the voltage stored in the capacitor C3, and the voltage V6 at the node N6 can be 2VDD due to the voltage V1 of ground at the node N1 and the voltage stored in the capacitor C4. Because the voltage V5 is 3VDD and the voltage V6 is 2VDD, the transistors T9 and T12 are turned off and the transistors T10 and T1 are turned on such that the voltage V5 of 3VDD is output to the load (CL and RL) and the capacitor C4 can be maintained at 2VDD by the voltage V4. At this time, the output of the second charge pump circuit 34b is disabled because the transistor T12 is turned off by the voltage V5 from the first charge pump circuit 32b.

During a second period, the first and second clock signals CLK1 and CLK2 are low and high respectively. The transistors T2 and T5 are turned off and transistor T1 and T6 are turned on, such that voltage V1 at the node N1 is VDD, voltage V2 at the node N2 is 2VDD, voltage V3 at node 3 is grounded, and voltage V4 at the node N4 is VDD.

The voltage V6 at the node N6 can be 3VDD due to the voltage V1 of VDD at the node N1 and the voltage stored in the capacitor C4, and the voltage V5 at the node N5 can be 2VDD due to the voltage V3 of ground at the node N3 and the voltage stored in the capacitor C3. Because the voltage V6 is 3VDD and the voltage V5 is 2VDD, the transistors T9 and T12 are turned on and the transistors T10 and T11 are turned off such that the voltage V6 of 3VDD is output to the load (RL and CL) and the capacitor C3 can be maintained at 2VDD by the voltage V2. At this time, the output of first charge pump circuit 32b is disabled because the transistor T10 is turned off by the voltage V6 from the second charge pump circuit 34b.

Figure 5C:
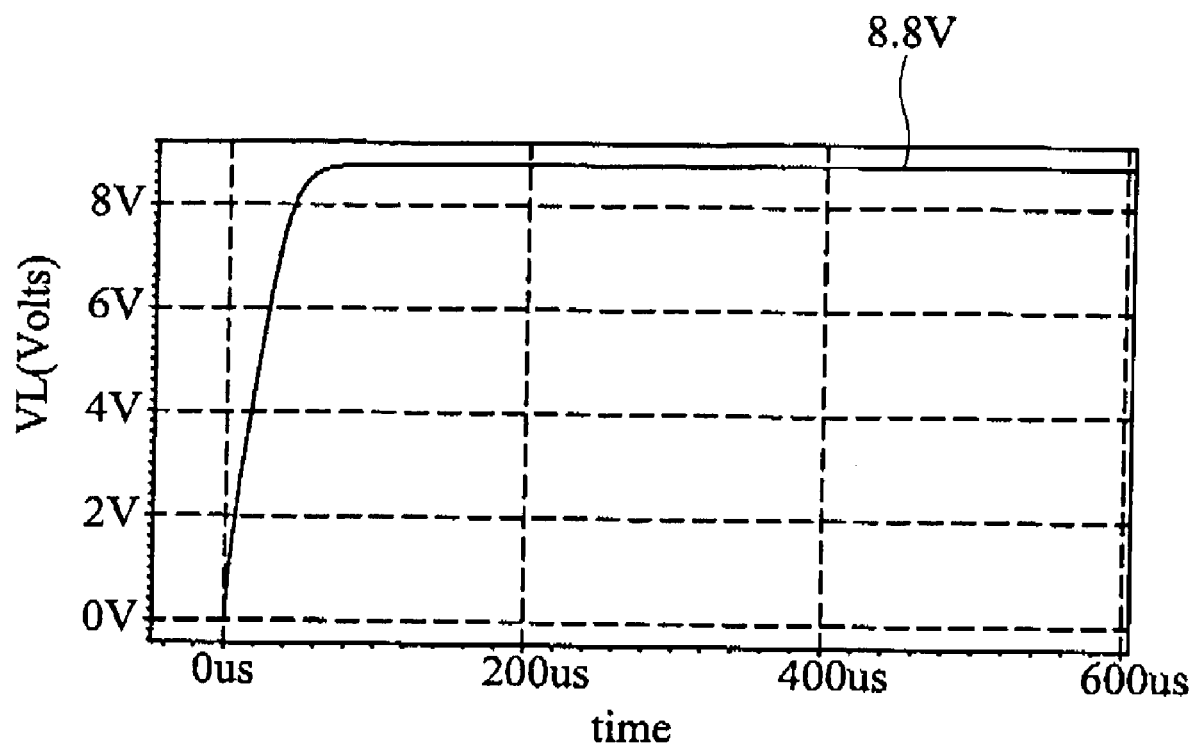
FIG. 5c is an output waveform diagram of the DC/DC converter according to the second embodiment of the present invention.
Figure 5D:
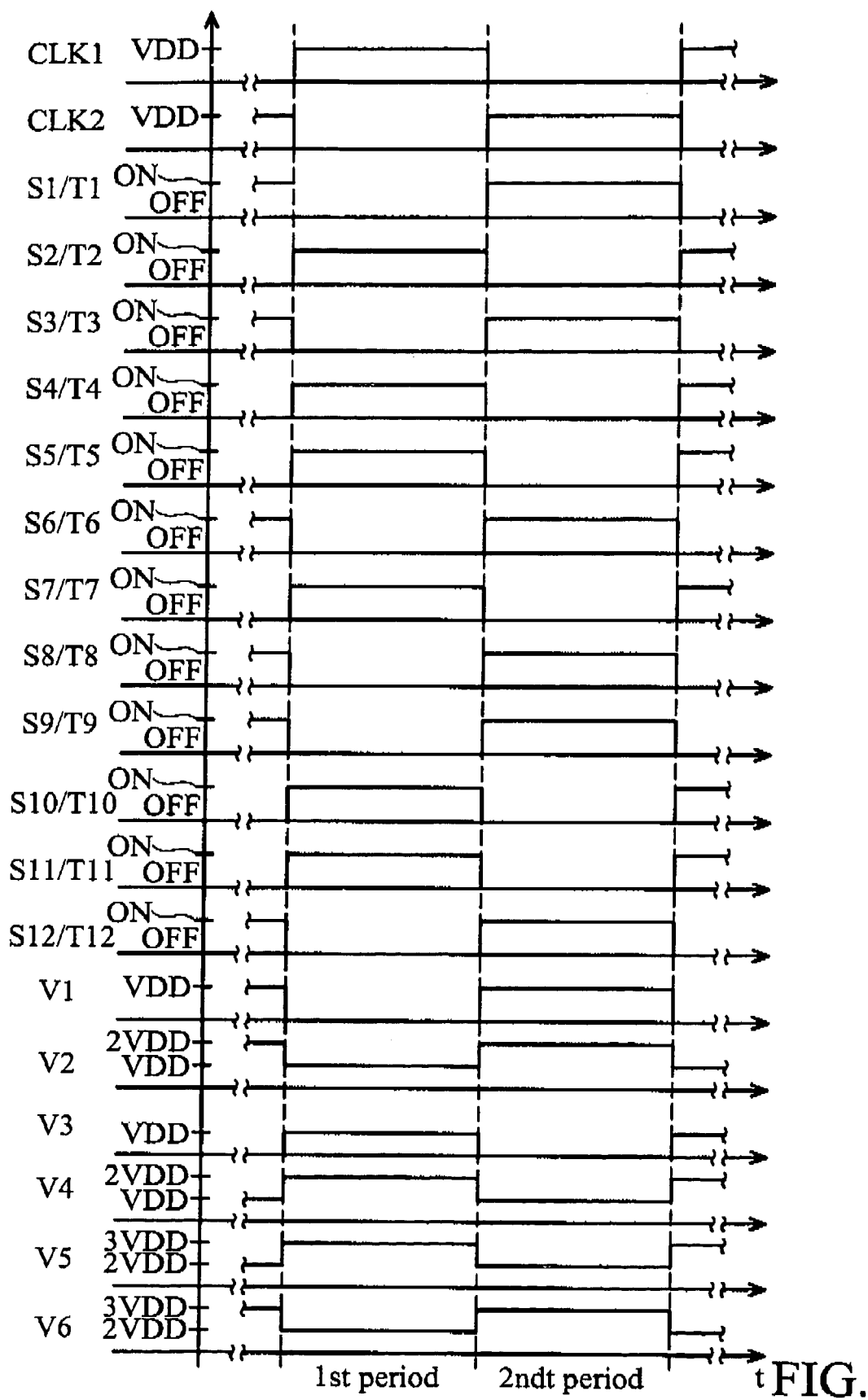
FIG. 5d is a timing diagram of the DC/DC converter according to the second embodiment of the present invention.

Therefore, in the DC/DC conversion circuit 30b, the first and second charge pump circuits 32b and 34b alternately output a boosted voltage of 3VDD as an output voltage VL to the load (RL and CL), and the output of first and second charge pump circuits 32b and 34b can be disabled alternately under the control of the first and second signals. Namely, the DC/DC conversion circuit 30b converts the input voltage VDD into a boosted voltage VL of 3VDD. FIG. 5c shows an output waveform of the DC/DC conversion circuit 30b, wherein the input voltage VDD is 3.3V, and the boosted voltage VL is about 8.8V.

THIRD EMBODIMENT

Figure 6A:
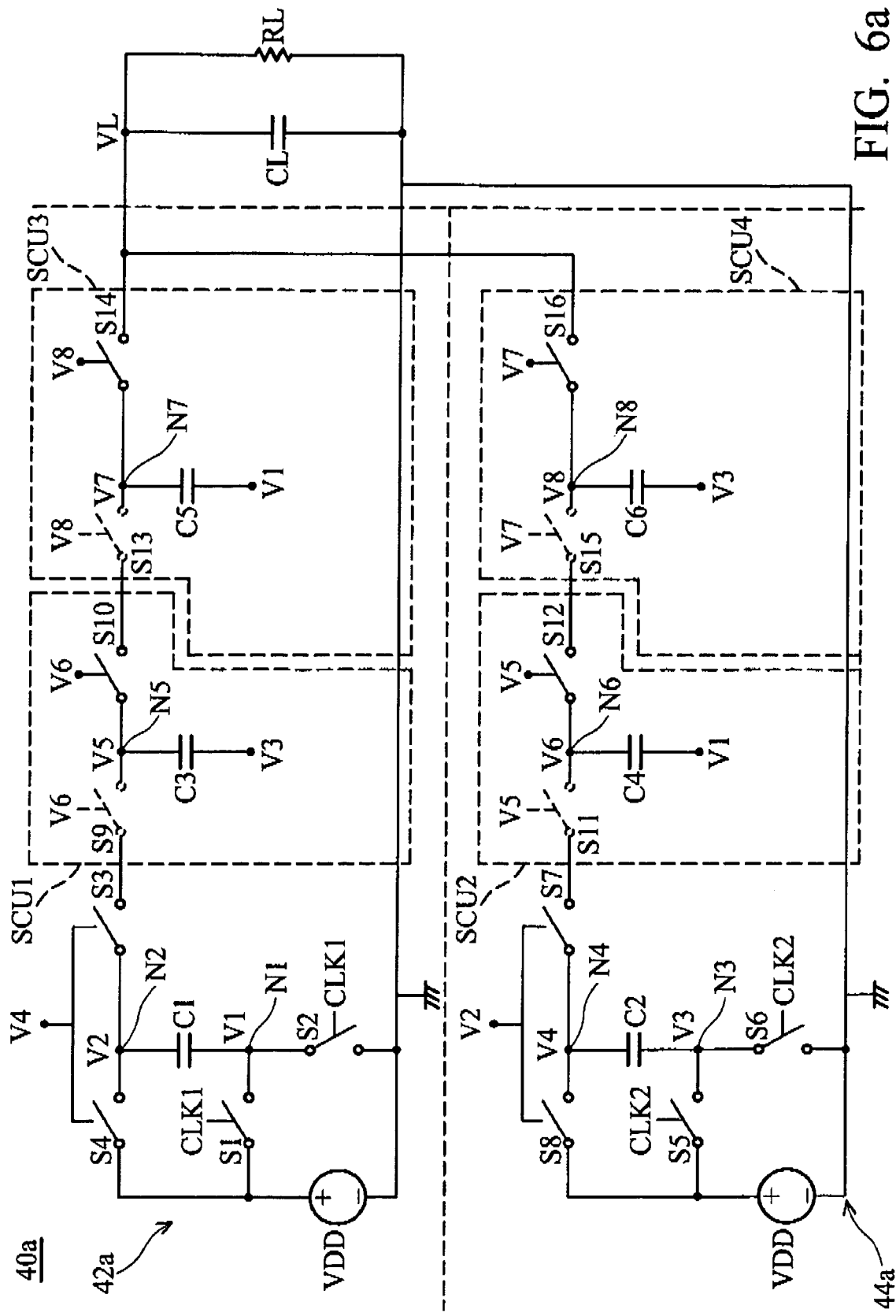
FIG. 6a is a schematic diagram of the DC/DC converter according to a third embodiment of the present invention.

FIG. 6a is a schematic diagram of a third embodiment according to the present invention. As shown in FIG. 6a, the DC/DC conversion circuit 40a comprises a first charge pump circuit 42a and a second charge pump circuit 44a connected in parallel and coupled between a first input voltage VDD and a load (RL and CL).

In the DC/DC conversion circuit 40a, the first charge pump circuit 42a is similar to the charge pump circuit 32a shown in FIG. 5a except for addition of a secondary charge pump unit SCU3 coupled in tandem to the SCU1, and the second charge pump circuit 44a is similar to the charge pump circuit 34a as shown in FIG. 5a except for addition of a secondary charge pump unit SCU4 coupled in tandem to the SCU2. For brevity, description of like structures is omitted.

In the embodiment, the first signal includes the voltage V2 at the node N2, the voltage V5 at the node N5 and voltage V7 at the node N7, and is coupled to the second charge pump circuit 34a. The second signal includes the voltage V4 at the node N4, the voltage V6 at the node N6 and voltage V8 at the node N8, and is coupled to the first charge pump circuit 32a. The switching devices S9, S1, S13 and S15 are optional, wherein the switching device S9 is designed to turn on when the switching device S10 turns off and to turn off when the switching device S10 turns on. The switching device S11 is designed to turn on when the switching device S12 turns off and to turn off when the switching device S12 turns on. The switching device S13 is designed to turn on when the switching device S14 turns off and to turn off when the switching device S14 turns on. The switching device S15 is designed to turn on when the switching device S16 turns off and to turn off when the switching device S16 turns on.

Operation of the DC/DC conversion circuit 40a is described as follows, with reference to FIGS. 6a and 6c.

During a first period, in the DC/DC conversion circuit 40a, the switching elements S2, S4, S5, S7, S10, S11, S13, and S16 are designed to turn on, and the switching elements S1, S3, S6, S8, S9, S12, S14 and S15 are designed to turn off according to the clock signals CLK1 and CLK2 and the first signal (V2, V5 and V7) and the second signal (V4, V6 and V8).

In the first charge pump circuit 42a, the input voltage VDD is stored in the capacitor C1 by the switching elements S1 and S3 turning off and the switching elements S2 and S4 on. 3VDD is stored in the capacitor C5 by the input voltage VDD and the voltage stored in the capacitor C3 (2VDD) by the switching elements S10 and S13 turning on and the switching elements S9 and S14 off.

In the second charge pump circuit 44a, 2VDD is stored in the capacitor C4 by the input voltage VDD and the voltage stored in the capacitor C2 (VDD) by the switching elements S5, S7 and S11 turning on and the switching elements S6, S8 and S12 off. A second boosted voltage of 4VDD produced by the input voltage VDD and the voltage stored in the capacitor C6 (3VDD) is output the load (RL and CL) by the switching elements S16 turning on and the switching element S15 off.

During a second period, in the DC/DC conversion circuit 40a, the switching elements S2, S4, S5, S7, S10, S11, S13 and S16 are designed to turn off, and the switching elements S1, S3, S6, S8, S9, S12, S14 and S15 are designed to turn on according to the clock signals CLK1 and CLK2 and the first signal (V2, V5 and V7) and the second signal (V4, V6 and V8).

In the first charge pump circuit 42a, 2VDD is stored in the capacitor C3 by the input voltage VDD and the voltage stored on the capacitor C1 (VDD) by the switching elements S1 and S3 turning on and the switching elements S2 and S4 off. A first boosted voltage of 4VDD produced by the input voltage VDD and the voltage storage in the capacitor C5 (3VDD) can be output to the load (RL and CL) by the switching elements S14 turning on and the switching element S13 off.

In the second charge pump circuit 44a, the input voltage VDD is stored in the capacitor C2 by the switching elements S6 and S8 turning on and the switching elements S5 and S7 off. In addition, 3VDD is stored in the storage capacitor C6 by the input voltage VDD and the voltage stored on the capacitor C4 (2VDD) by the switching elements S12 and S15 turning on and the switching elements S11 and S16 off. Namely, in the DC/DC conversion circuit 40a, the first and second charge pump circuits 42a and 44a alternately output a boosted voltage of 4VDD as an output voltage VL to the load (RL and CL). Thus, the DC/DC conversion circuit 40a converts the input voltage VDD to a boosted voltage VL of 4VDD. Further, under the control of the control signal (CLK1 and CLK2), the first signal (V2, V5 and V7) disables output of the second charge pump circuit 44a or the second signal (V4, V6, and V8) disables output of the first charge pump circuit 42a.

Figures 1, 6B:
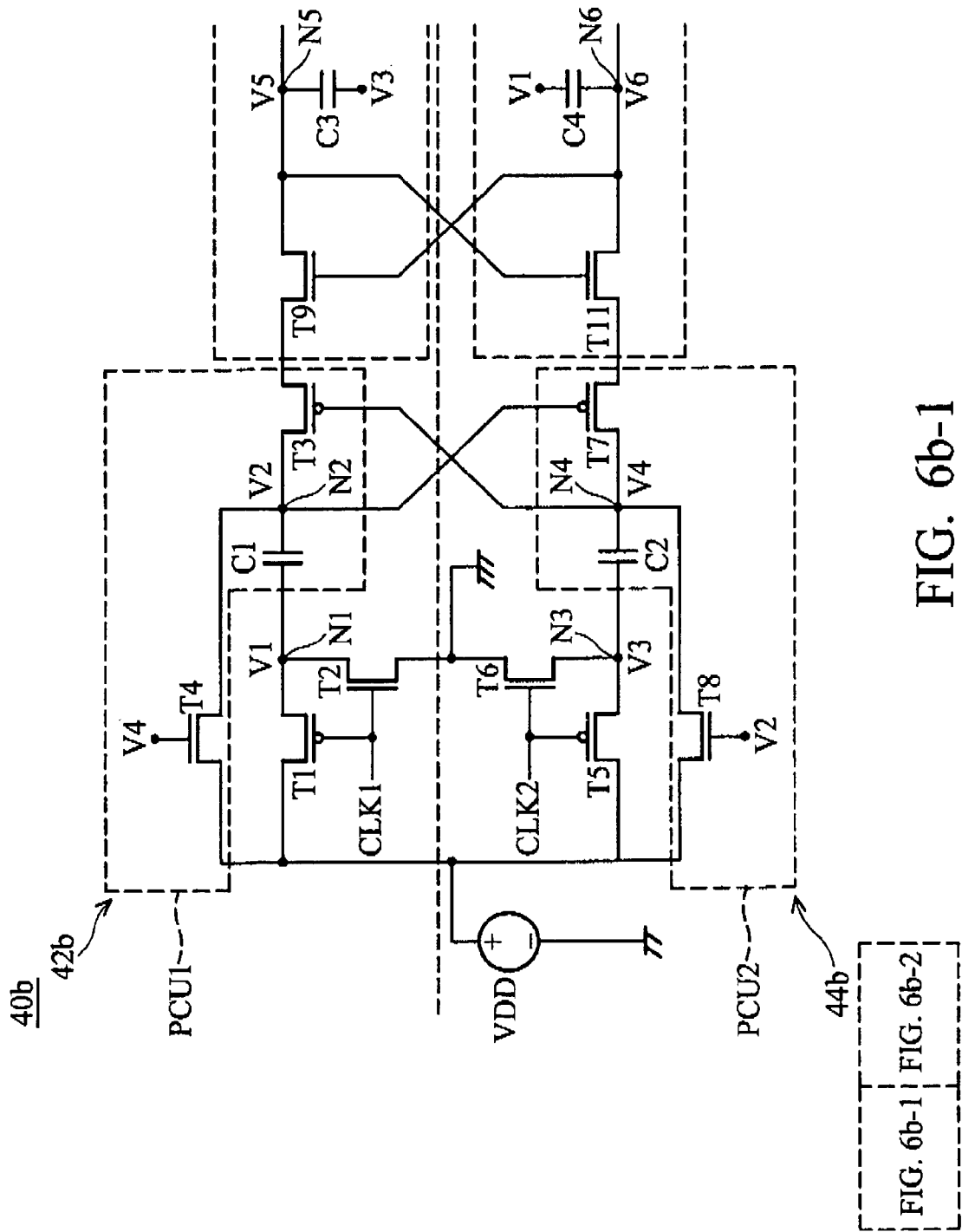
FIGS. 6b (6b-1 and 6b-2) is a circuit diagram of the DC/DC converter according to the third embodiment of the present invention.
Figures 2, 6B:
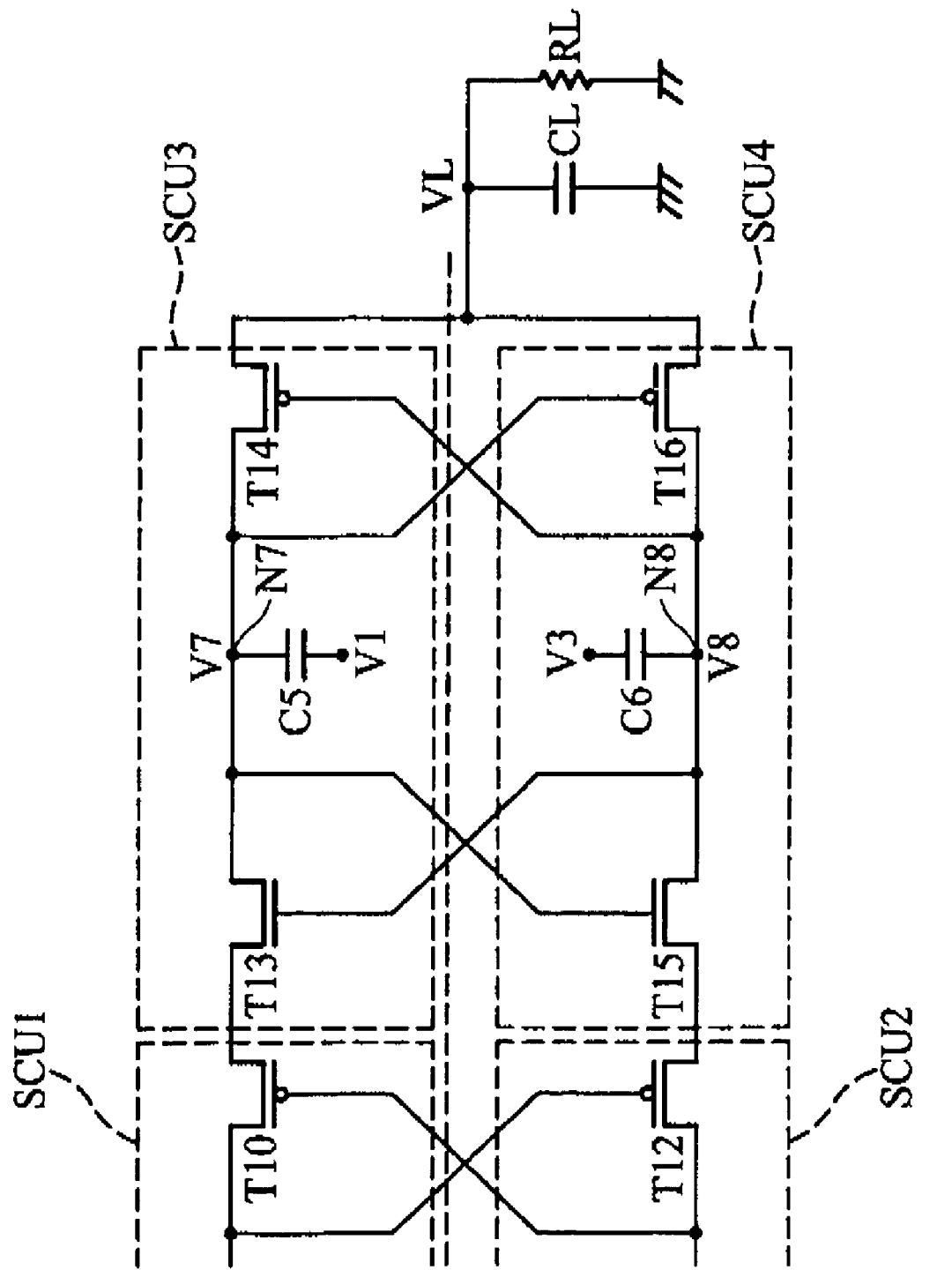
Figure 6C:
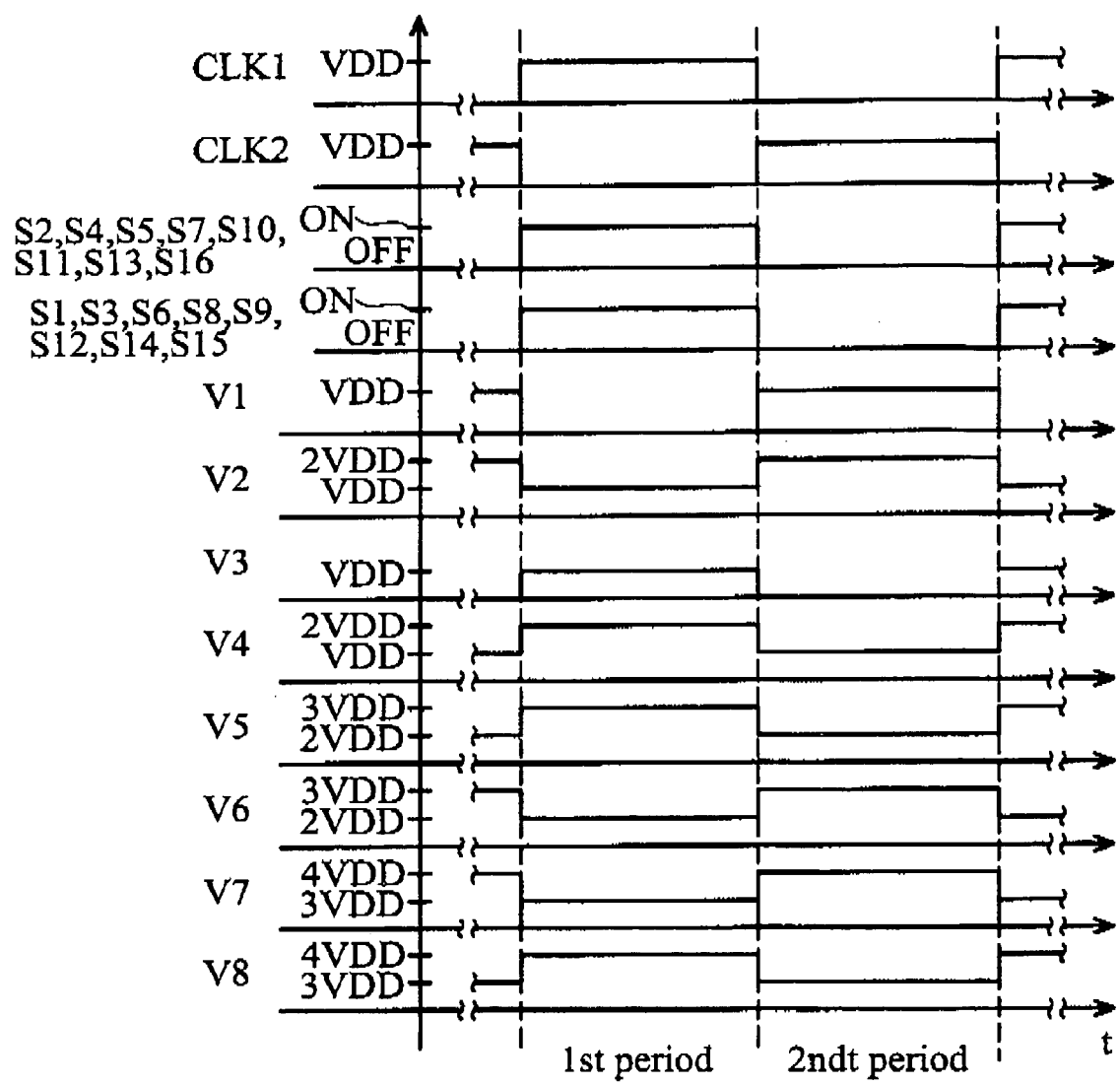
FIG. 6c is a timing diagram of the DC/DC converter according to the third embodiment of the present invention.

FIG. 6b (6b-1 and 6b-2) is a circuit diagram of the third embodiment according to the present invention. As shown in FIG. 6b, the first charge pump circuit 42b is similar to the charge pump circuit 32b shown in the FIG. 5b expect for addition of the secondary charge pump unit SCU3 coupled between the secondary charge pump unit SCU1 and the load (RL and CL). The second charge pump circuit 44b is similar to the charge pump circuit 34b shown in FIG. 5b except for addition of the secondary charge pump unit SCU4 coupled between the secondary charge pump unit SCU2 and the load (RL and CL). For brevity, description of like structures is omitted. The transistor T1~T16 correspond to the switching devices S1~S16 shown in FIG. 6a.

Operation of the DC/DC conversion circuit 40b is described as follows, with reference to FIGS. 6b and 6c.

During a first period, the first and second clock signals CLK1 and CLK2 are high and low respectively. The transistors T1 and T6 are turned off and transistor T2 and T5 are turned on, such that voltage V1 at node 1 is grounded, voltage V2 at the node N2 is VDD, voltage V3 at the node N3 is VDD and voltage V4 at the node N4 is 2VDD. Because the voltage V2 is VDD and the voltage V4 is 2VDD, the transistors T4 and T7 are turned on and transistors T3 and T8 are turned off.

The voltage V5 at the node N5 can be 3VDD due to the voltage V3 of VDD at the node N3 and the voltage stored in the capacitor C3, and the voltage V6 at the node N6 can be 2VDD due to the voltage V1 of ground at the node N1 and the voltage stored in the capacitor C4. Because the voltage V5 is 3VDD and the voltage V6 is 2VDD, the transistors T9 and T12 are turned off and the transistors T10 and T11 are turned on. The voltage V7 at the node N7 can be 3VDD due to the voltage V1 of ground at the node N1 and the voltage stored in the capacitor C5, and the voltage V8 at the node NB can be 4VDD due to the voltage stored in the capacitor C6 and the voltage V3 of VDD at the node N3. Because the voltage V8 is 4VDD and the voltage V7 is 3VDD, the transistors T13 and T16 are turned on and the transistors T14 and T15 are turned off such that the voltage V8 of 4VDD is output to the load (RL and CL) and the capacitor C5 can be maintained at 3VDD by the voltage V5. At this time, the output the first charge pump circuit 42b is disabled because the transistor T14 is turned off by the voltage V8 from the second charge pump circuit 44b.

During a second period, the first and second clock signals CLK1 and CLK2 are low and high respectively. The transistors T2 and T5 are turned off and transistor T1 and T6 are turned on, such that the voltage V1 at the node N1 is VDD, the voltage V2 at the node N2 is 2VDD, the voltage V3 at node 3 is grounded, and the voltage V4 at the node N4 is VDD.

The voltage V6 at the node N6 can be 3VDD due to the voltage V1 of VDD at the node N1 and the voltage stored in the capacitor C4, and the voltage V5 at the node N5 can be 2VDD due to the voltage V3 of ground at the node N3 and the voltage stored in the capacitor C3. Because the voltage V6 is 3VDD and the voltage V5 is 2VDD, the transistors T9 and T12 are turned on and the transistors T10 and T11 are turned off. The voltage V8 at the node N8 can be 3VDD due to the voltage V3 of ground at the node N3 and the voltage stored in the capacitor C6, and the voltage V7 at the node N7 can be 4VDD due to the voltage stored in the capacitor C5 and the voltage V1 of VDD at the node N1. Because the voltage V7 is 4VDD and the voltage V8 is 3VDD, the transistors T13 and T16 are turned off and the transistors T14 and T15 are turned on such that the voltage V7 of 4VDD is output to the load (RL and CL) and the capacitor C6 can be maintained at 3VDD by the voltage V6. At this time, the second charge pump circuit 44b is disabled because transistor T16 is turned off by the voltage V7 from the first charge pump circuit 42b.

Therefore, in the DC/DC conversion circuit 40b, the first and second charge pump circuits 42b and 44b alternately output a boosted voltage of 4VDD as an output voltage VL to the load (RL and CL). Namely, the DC/DC conversion circuit 40b converts the input voltage VDD to a boosted voltage VL of 4VDD.

FOURTH EMBODIMENT

Figure 7A:
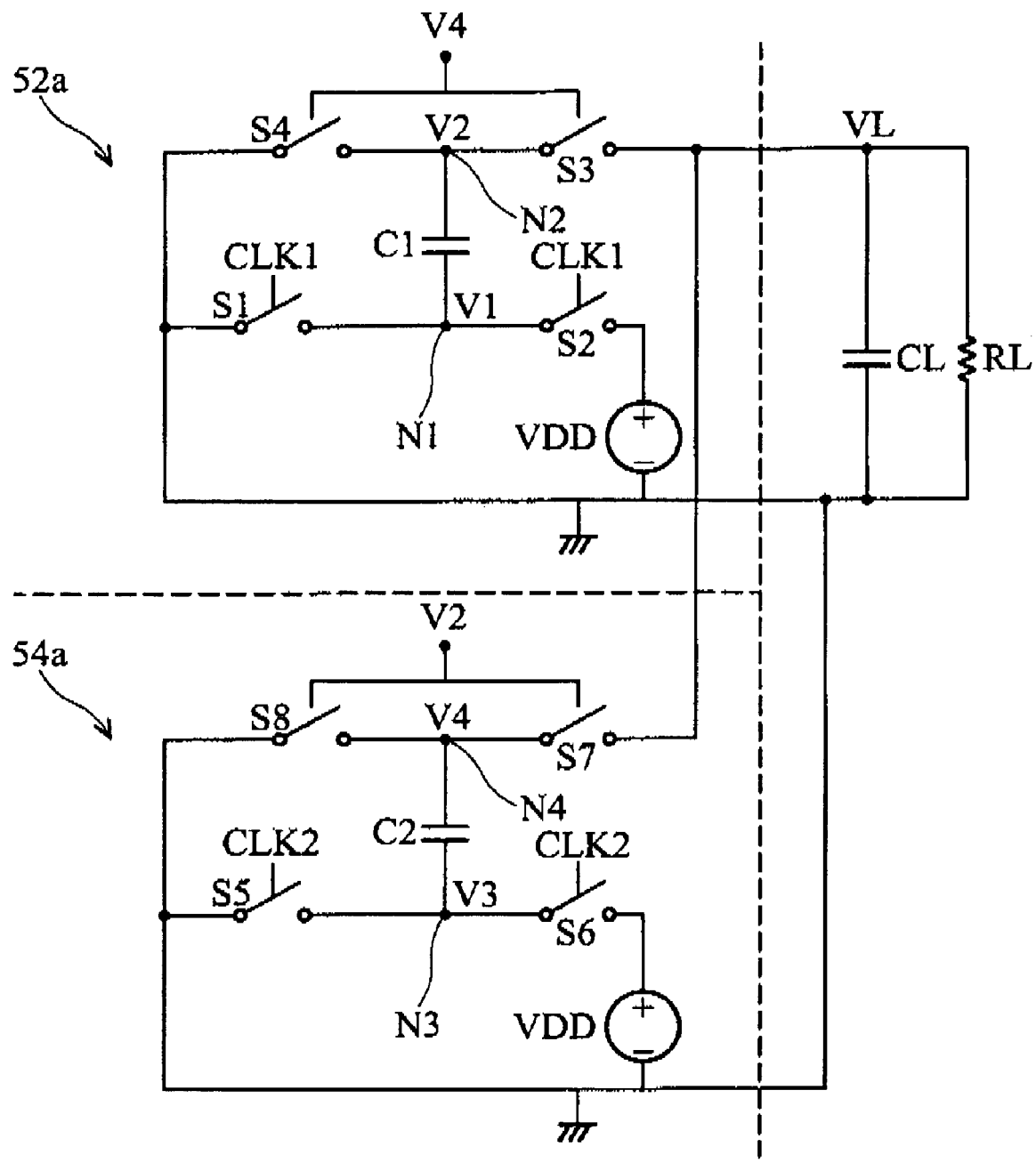
FIG. 7a is a schematic diagram of the DC/DC converter according to a fourth embodiment of the present invention.

FIG. 7a is a schematic diagram of a fourth embodiment according to the present invention. As shown in FIG. 7a, in the DC/DC conversion circuit 50a, the first charge pump circuit 52a is similar to the charge pump circuit 22a shown in FIG. 4a except that the switching element S1 is coupled between the node N1 and ground and the switching element S2 is coupled between the node N1 and the input voltage VDD. The second charge pump circuit 54a is similar the charge pump circuit 24a as shown in FIG. 4a except that the switching element S5 is coupled between the node N3 and ground and the switching element S6 is coupled between the node N3 and the input voltage VDD. For brevity, description of like structures is omitted.

During a first period, in the DC/DC conversion circuit 50a, the switching elements S2, S4, S5 and S7 are designed to turn on, and the switching elements S1, S3, S6 and S8 are designed to turn off according to the clock signals CLK1 and CLK2 and the first signal (V2) and the second signal (V4). In the first charge pump circuit 52a, −VDD is stored in the capacitor C1 by the input voltage VDD and by the switching elements S2 and S4 turning on and the switching elements S1 and S3 off. In addition, the second charge pump circuit 54a, a boosted voltage of −VDD stored in the capacitor C2 is output to the load (RL and CL) by the switching elements S5 and S7 turning on and the switching elements S6 and S8 off.

During a second period, in the DC/DC conversion circuit 50a, the switching elements S2, S4, S5 and S7 are designed to turn off, and the switching elements S1, S3, S6 and S8 are designed to turn on according to the clock signals CLK1 and CLK2 and the first signal (v2) and the second signal (V4). In the first charge pump circuit 52a, −VDD stored in the capacitor C1 is output to the load (RL and CL) by the switching elements S1 and S3 turning on and the switching elements S2 and S4 off. In addition, in the second charge pump circuit 54a, −VDD is stored in the capacitor C2 by the input voltage VDD and by the switching elements S6 and S8 turning on and the switching elements S5 and S7 off. Namely, in the DC/DC conversion circuit 50a, the first and second charge pump circuits 52a and 54a alternately output a boosted voltage of −VDD as an output voltage VL to the load (RL and CL). Thus, the DC/DC conversion circuit 50a converts the input voltage VDD to a boosted voltage VL of −VDD. Further, under the control of the control signal (CLK1 and CLK2), the first signal (V2) disables output of the second charge pump circuit 54a or the second signal (V4) disables output of the first charge pump circuit 52a.

Figure 7B:
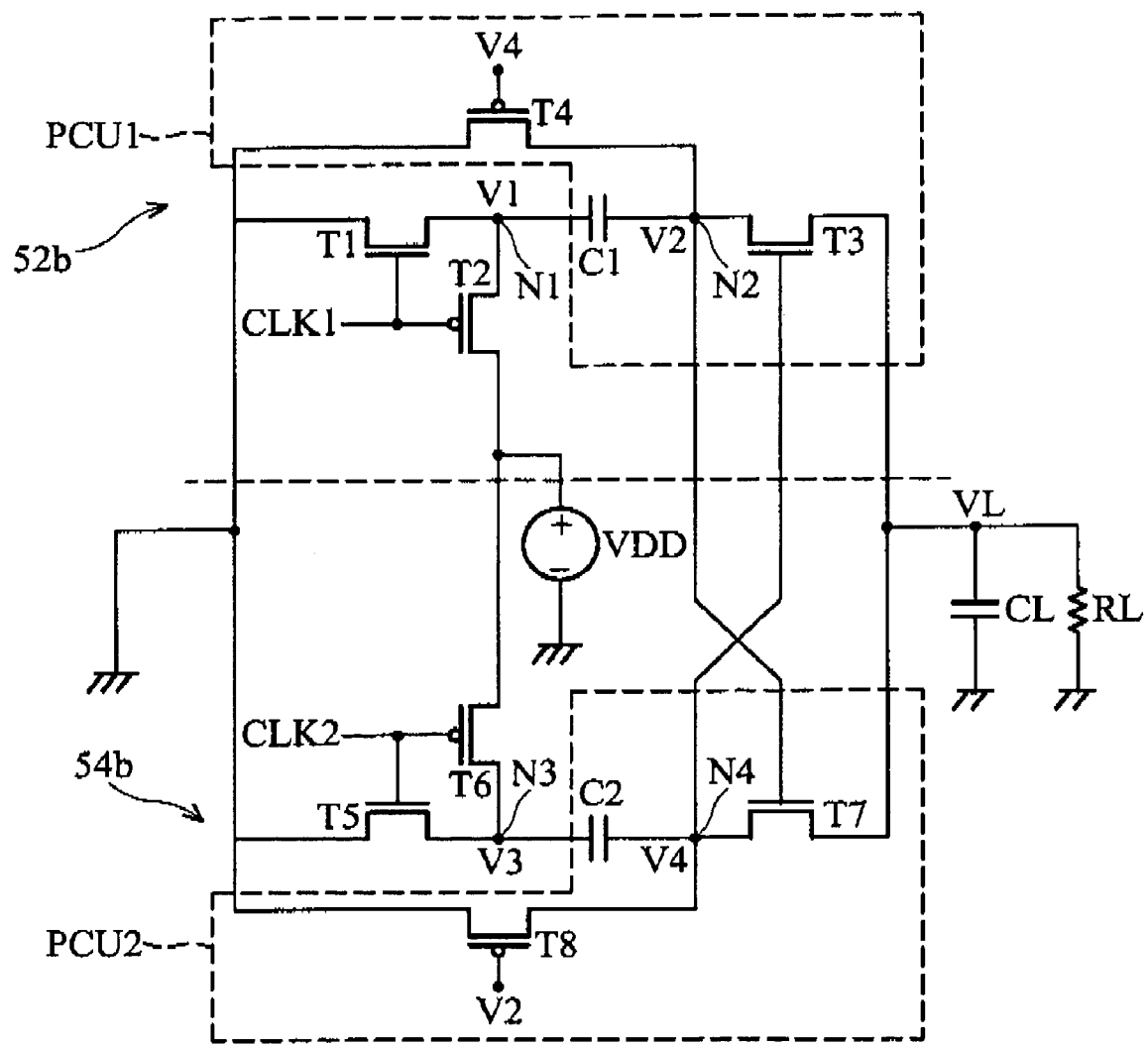
FIG. 7b is a circuit diagram of the DC/DC converter according to the fourth embodiment of the present invention.

FIG. 7b is a circuit diagram of the fifth embodiment according to the present invention.

As shown in FIG. 7b, in the DC/DC conversion circuit 50b, the first charge pump circuit 52b is similar to the charge pump circuit 22b shown in FIG. 4b except that the transistor T1 is coupled between the node N1 and ground and the transistor T2 is coupled between the node N1 and the input voltage VDD. The second charge pump circuit 54b is similar to the charge pump circuit 24a as shown in FIG. 4a except that the transistor T5 is coupled between the node N3 and ground and the transistor T6 is coupled between the node N3 and the input voltage VDD. For brevity, description of like structures is omitted. The transistor T1~T8 correspond to the switching devices S1~S8 shown in FIG. 7a.

Figure 7C:
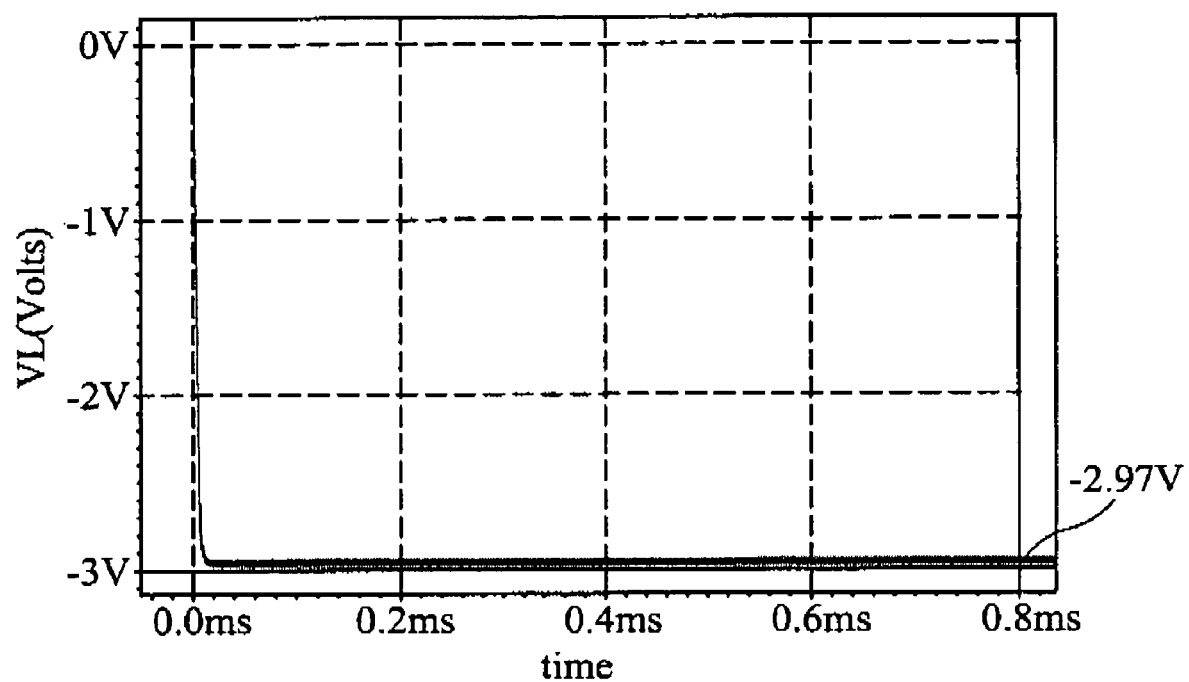
FIG. 7c is an output waveform diagram of the DC/DC converter according to the fourth embodiment of the present invention.
Figure 7D:
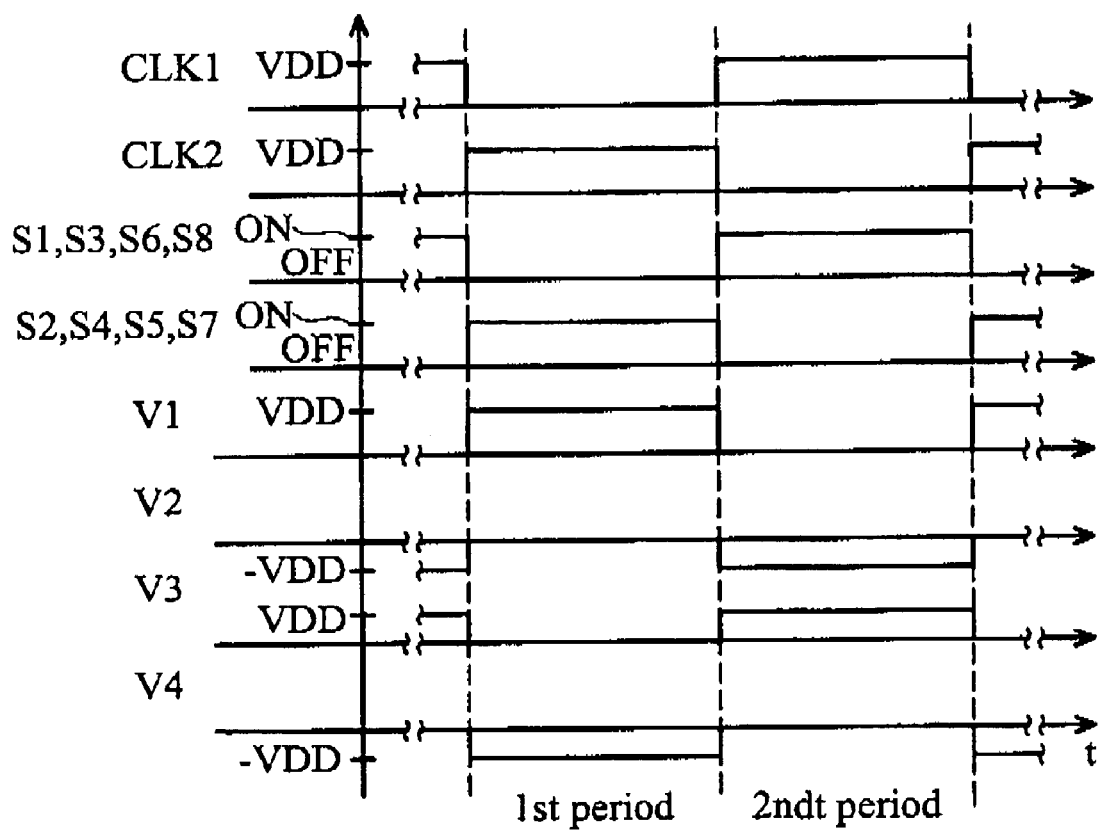
FIG. 7d is a timing diagram of the DC/DC converter according to the fourth embodiment of the present invention.

Operation of the DC/DC conversion circuit 50b is described as follows, with reference to FIGS. 7b and 7d.

During a first period, the first and second clock signals CLK1 and CLK2 are low and high respectively. The transistors T2 and T5 are turned on and transistor T1 and T6 are turned off, such that voltage V1 at the node N1 is VDD, voltage V2 at the node N2 is grounded, voltage V3 at node 3 is grounded, and voltage V4 at the node N4 is −VDD. Because the voltage V4 is −VDD and the voltage V2 is grounded, the transistors T3 and TB are turned off and transistors T4 and T7 are turned on, such that the voltage V4 of −VDD acts as a boosted voltage VL output to the load (RL and CL), and the output of the first charge pump circuit 52b is disabled because transistor T3 is turned off by the voltage V4 from the second charge pump circuit 54b.

During a second period, the first and second clock signals CLK1 and CLK2 are high and low respectively. The transistors T1 and T6 are turned on and transistors T2 and T5 are turned off, such that voltage V1 at node 1 is grounded, voltage V2 at the node N2 is −VDD, voltage V3 at the node N3 is VDD and voltage V4 at the node N4 is grounded. Because the voltage V2 is −VDD and the voltage V4 is grounded, the transistors T4 and T7 are turned off and transistors T3 and T8 are turned on, such that the voltage V2 of −VDD acts as a boosted voltage VL output to the load (RL and CL), and the output of the second charge pump circuit 54b is disabled because the transistor T7 is turned off by the voltage V2 from the first charge pump circuit 52b.

Thus, in the DC/DC conversion circuit 50b, the first and second charge pump circuits 52b and 54b alternately output a boosted voltage of −VDD as an output voltage VL to the load (RL and CL). Namely, the DC/DC conversion circuit 50b converts the input voltage VDD to a boosted voltage VL of −VDD. FIG. 7c shows an output waveform of the DC/DC conversion circuit 20b, wherein the input voltage VDD is 3.3V, and the boosted voltage VL is about −2.97V.

FIFTH EMBODIMENT

Figure 8A:
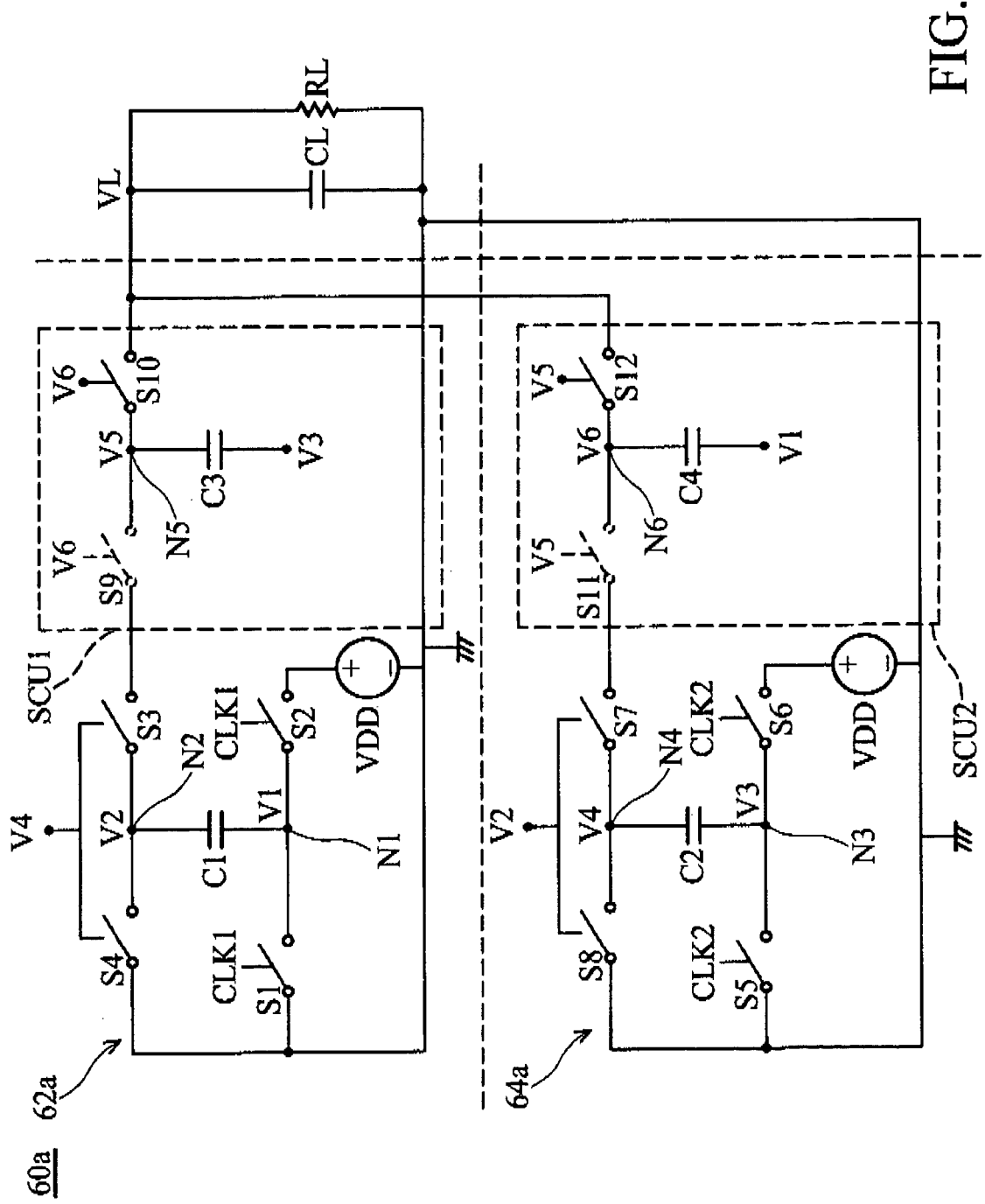
FIG. 8a is a schematic diagram of the DC/DC converter according to a fifth embodiment of the present invention.

FIG. 8a is a schematic diagram of a fifth embodiment according to the present invention. As shown in FIG. 8a, in the DC/DC conversion circuit 60a, the first charge pump circuit 62a is similar to the charge pump circuit 52a shown in FIG. 7a except for addition of a secondary charge pump unit SCU1. The second charge pump circuit 64a is similar to the charge pump circuit 54a as shown in FIG. 7a except for addition of a secondary charge pump unit SCU2. For brevity, description of like structures is omitted.

In this embodiment, the voltage V2 at the node N2 and the voltage V5 at the node N5, as the first signal, are coupled to the second charge pump circuit 64a, and the voltage V4 at the node N4 and the voltage V6 at the node N6, as second signal, are coupled to the first charge pump circuit 62a. The switching devices S9 and S11 are optional, wherein the switching device S9 is designed to turn on when the switching device S10 turns off and to turn off when the switching device S10 turns on. The switching device S11 is designed to turn on when the switching device S12 turns off and to turn off when the switching device S12 turns on.

Operation of the DC/DC conversion circuit 60a is described as follows, with reference to FIGS. 8a and 8d.

During a first period, in the DC/DC conversion circuit 30a, the switching elements S2, S4, S5, S7, S10 and S11 are designed to turn on, and the switching elements S1, S3, S6, S8, S39 and S12 are designed to turn off according to the clock signals CLK1 and CLK2 and the first signal (V2 and V5) and the second signal (V4 and V6).

In the DC/DC conversion circuit 60a, the first and second charge pump circuits 62a and 64a can alternately output a boosted voltage of −2VDD as an output voltage VL to the load (RL and CL). Namely, in the DC/DC conversion circuit 60a, the first and second charge pump circuits 62a and 64a alternately output a boosted voltage of −2VDD as an output voltage VL to the load (CL and RL). Thus, the DC/DC conversion circuit 60a converts the input voltage VDD to a boosted voltage VL of −2VDD. Further, under the control of the control signal (CLK1 and CLK2), the first signal (V2 and V5) disables output of the second charge pump circuit 64a or the second signal (V4 and V6) disables output of the first charge pump circuit 62a.

Figure 8B:
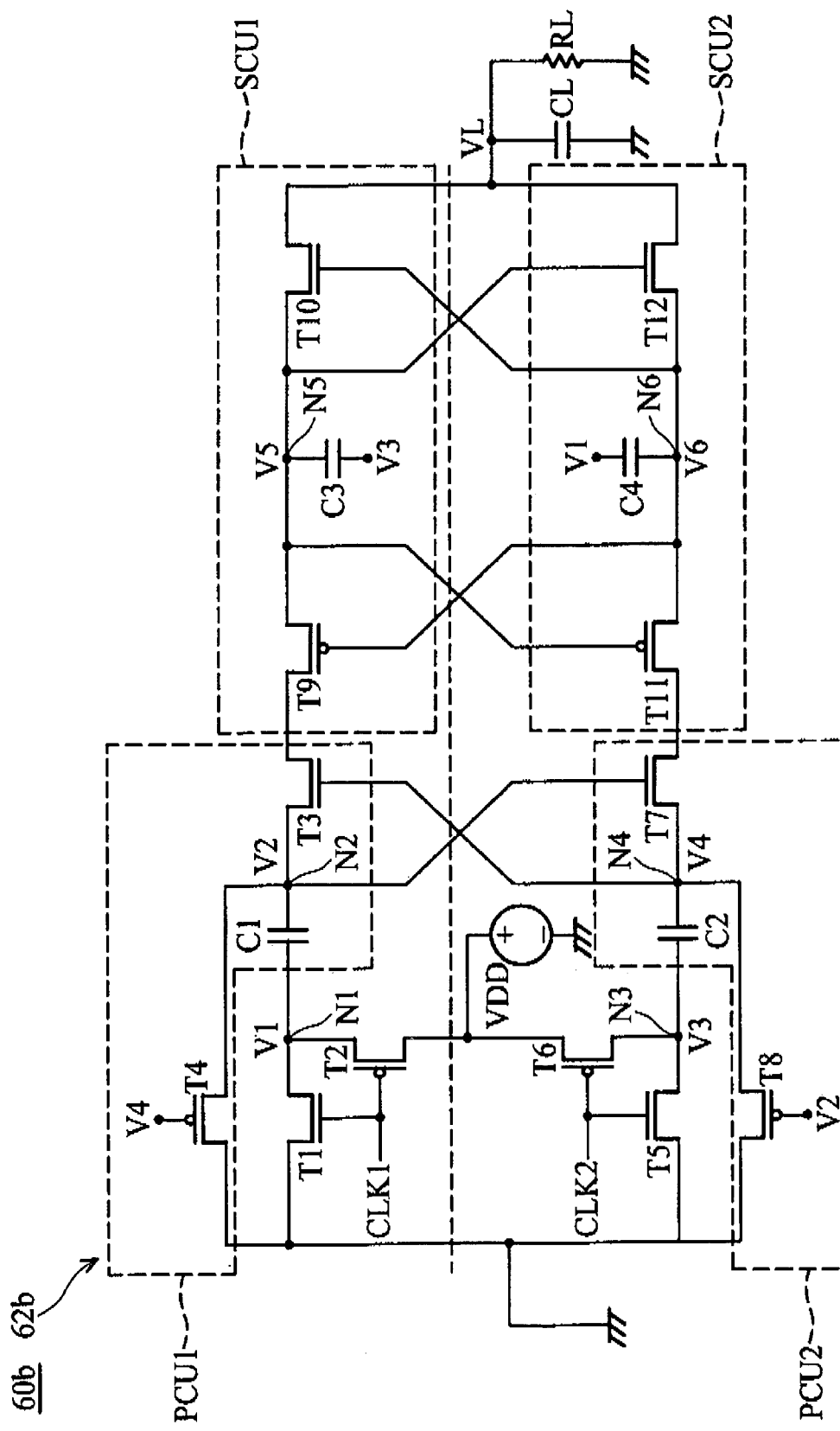
FIG. 8b is a circuit diagram of the DC/DC converter according to the fifth embodiment of the present invention.

FIG. 8b is a circuit diagram of the fifth embodiment according to the present invention. As shown in FIG. 8b, the first charge pump circuit 62b is similar to the charge pump circuit 52b shown in the FIG. 7b expect for addition of the secondary charge pump unit SCU1 coupled between the charge pump unit PC U and the storage capacitor. The second charge pump circuit 64b is similar to the charge pump circuit 54b shown in FIG. 7b except for addition of the secondary charge pump unit SCU2 coupled between the charge pump unit PCU2 and the storage capacitor. For brevity, description of like structures is omitted. The transistor T1~T12 correspond to the switching devices S12 shown in FIG. 8a.

Operation of the DC/DC conversion circuit 60b is described as follows, with reference to FIGS. 8b and 8d.

During a first period, the first and second clock signals CLK1 and CLK2 are low and high respectively. The transistors T2 and T5 are turned on and transistor T1 and T6 are turned off, such that voltage V1 at the node N1 is VDD, voltage V2 at the node N2 is grounded, voltage V3 at node 3 is grounded, and voltage V4 at the node N4 is −VDD. Because voltage V4 is −VDD and the voltage V2 is grounded, the transistors T3 and T8 are turned off and transistors T4 and T7 are turned on. The voltage V5 at the node N5 can be −2VDD by the voltage V3 of ground and the voltage stored in the capacitor C3, and the voltage V6 at the node N6 can be −VDD by the voltage V1 of VDD and the voltage stored in the capacitor C4. Because the voltage V5 is −2VDD and the voltage V6 is −VDD and the transistors T9 and T12 are turned off and the transistors T10 and T10 are turned on, such that the voltage V5 of −2VDD acts as a boosted voltage VL output to the load (RL and CL), and the voltage V6 can be maintained at −VDD by the voltage V4. Further, the output of the second charge pump circuit 64b is disabled because the transistor T12 is turned off by voltage V5 from the first charge pump circuit 62b.

During a second period, the first and second clock signals CLK1 and CLK2 are high and low respectively. The transistors T1 and T6 are turned on and transistor T2 and T5 are turned off, such that voltage V1 at node 1 is grounded, the voltage V2 at the node N2 is −VDD, the voltage V3 at the node N3 is VDD and the voltage V4 at the node N4 is grounded. Because the voltage V2 is −VDD and the voltage V4 is grounded, the transistors T4 and T7 are turned off and transistors T3 and T8 are turned on. The voltage V5 at the node N5 can be −VDD by the voltage V3 at the node N3 and the voltage stored in the capacitor C3, and the voltage V6 at the node N6 can be −2VDD by voltage ground at the node N1 and voltage stored in the capacitor C4. Because the voltage V5 is −VDD and the voltage V6 is −2VDD, the transistors T9 and T12 are turned on and the transistors T11 and T10 are turned off, such that the voltage V6 of −2VDD acts as a boosted voltage VL output to the load (RL and CL), and the voltage V5 at the node N5 can be maintained at −VDD by the voltage V2. Further, the output of the first charge pump circuit 52b is disabled because the transistor T10 is turned off by the voltage V6 from the second charge pump circuit 64b.

Figure 8C:
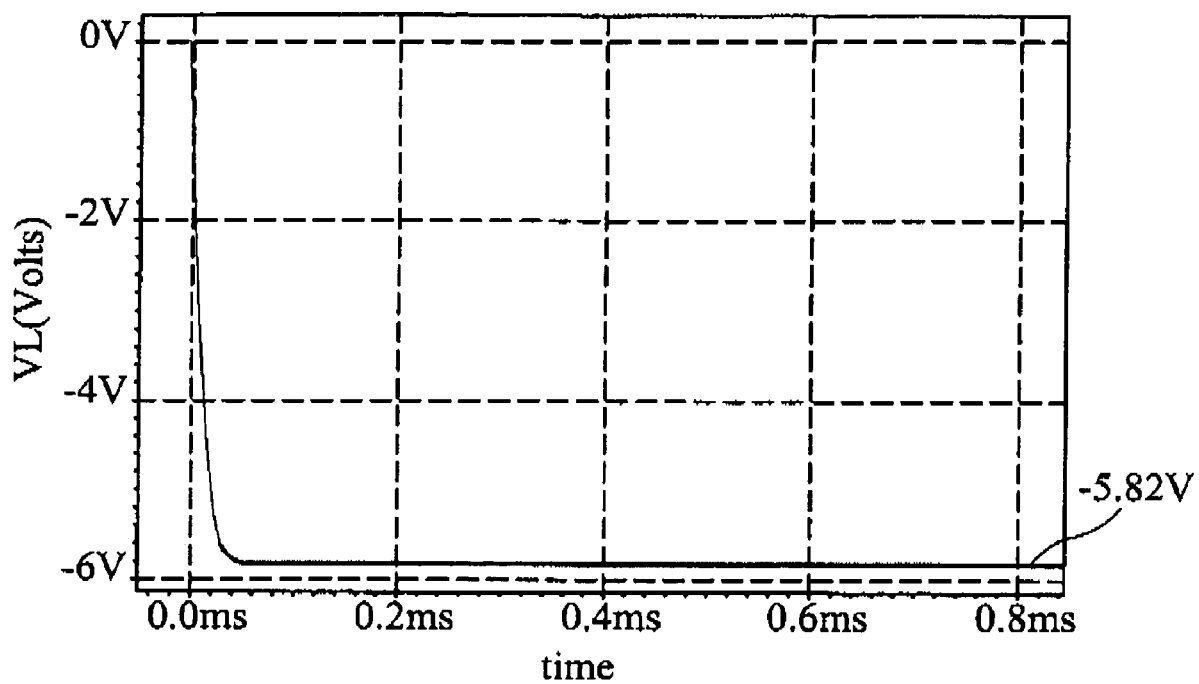
FIG. 8c is an output waveform diagram of the DC/DC converter according to the fifth embodiment of the present invention.
Figure 8D:
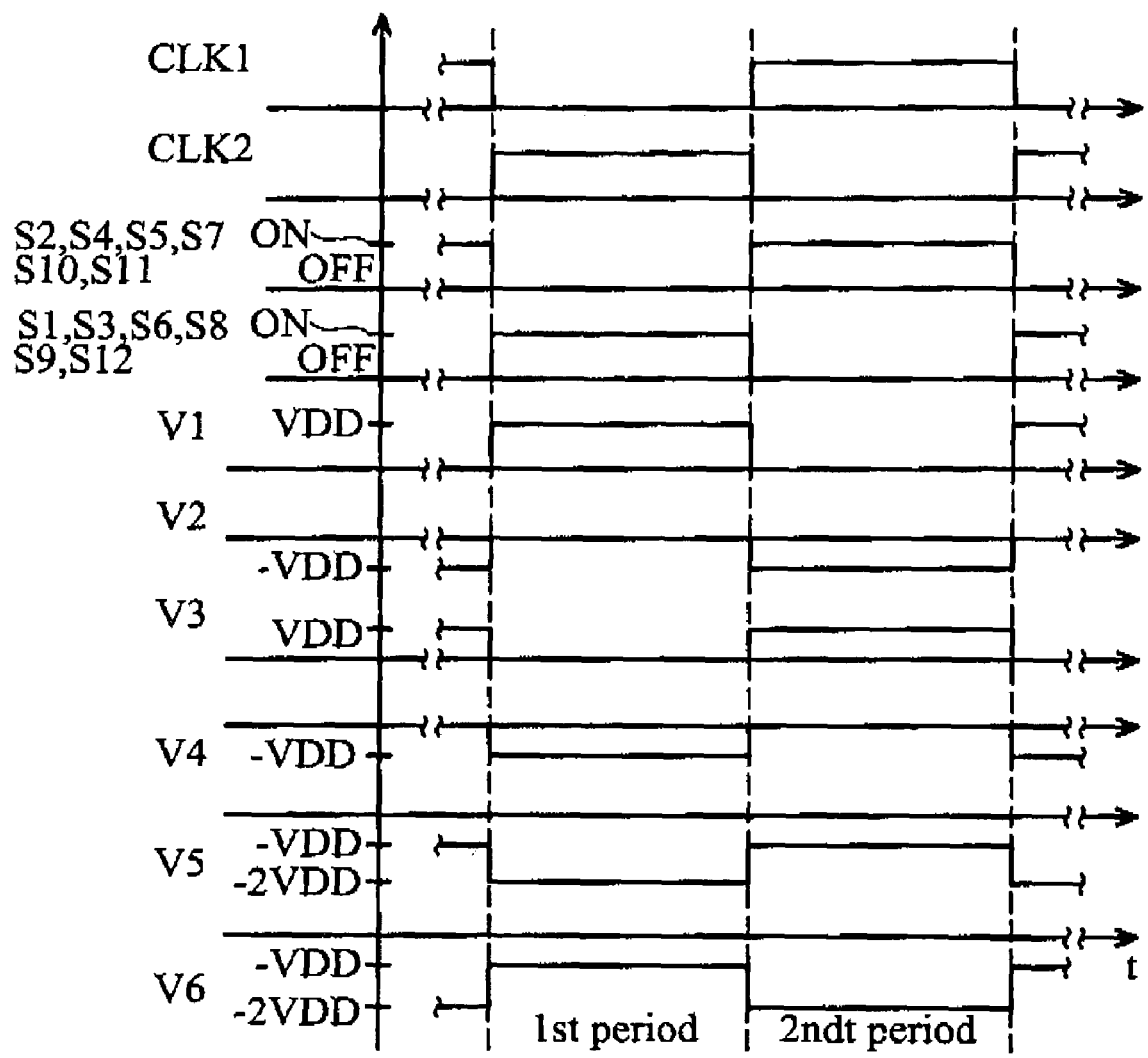
FIG. 8d is a timing diagram of the DC/DC converter according to the fifth embodiment of the present invention.

Therefore, in the DC/DC conversion circuit 60b, the first and second charge pump circuits 62b and 64b alternately output a boosted voltage of −2VDD as an output voltage VL to the load (RL and CL). Namely, the DC/DC conversion circuit 60b converts the input voltage VDD to a boosted voltage VL of −2VDD. FIG. 8c shows an output waveform of the DC/DC conversion circuit 60b, wherein the input voltage VDD is 3.3V, and the boosted voltage VL is about −5.82V.

In the present invention, the DC/DC conversion circuit 20 can convert the input voltage VDD to a boosted voltage for output to a load, such as display panel without an extra voltage boost circuit as in a conventional DC/DC conversion circuit. Thus, circuit complexity is reduced and overall conversion efficiency is improved.

Figure 9:
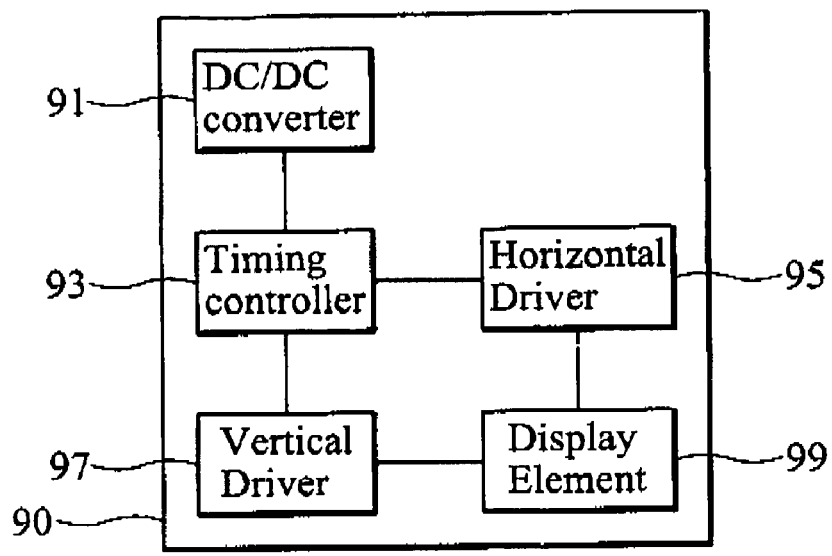
FIG. 9 is a schematic diagram of a system on panel comprising a DC/DC conversion circuit of the present invention.

In the present invention, each DC/DC conversion circuit 20a~60a and 20b~60b can be integrated and formed on panel. As shown in FIG. 9, a DC/DC converter 91, a timing controller 93, a horizontal driver 95, a vertical driver 97 and a display element 99 are integrated in the display panel 90. For example, the timing controller 93 can provide control clock signals for the DC/DC converter 91, the horizontal driver 95 and the vertical driver 97. The DC/DC converter converts input voltage into desired voltage to power the timing controller 93, the horizontal driver 95 and a vertical driver 97. The horizontal driver 95 and the vertical driver 97 drive the display element 99 according to the control clock signals from timing controller 93. In the present invention, all switching elements S11~S20 and the transistors T1~T16 can be thin film transistors the same as those in the display element 99.

Figure 10:
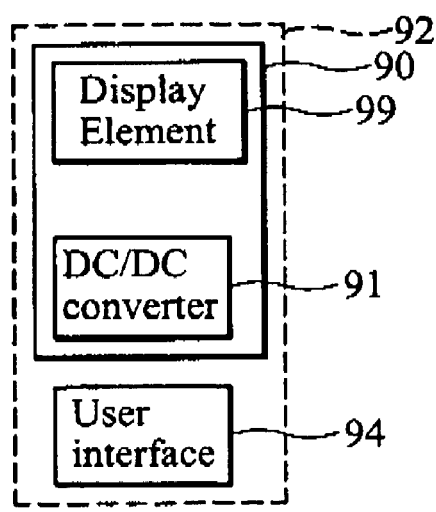
FIG. 10 is a schematic diagram of an electronic device comprising a display panel with a DC/DC conversion circuit of the present invention.

FIG. 10 schematically shows an electronic device 100 deploying a display panel 90 having a DC/DC converter 91 as described above. The electronic device 100 may be a portable device such as a PDA, notebook computer, tablet computer, cellular phone, a display monitor device, or other. Generally, the electronic device 100 comprises a housing 92, the display system on the panel 90 comprising the DC/DC converter 91 and a display element 99, and a user interface 94, etc. Further, the DC/DC conversion circuit in accordance with the present invention may be deployed to provide output voltage to power the display element and user interface.

While the inventive DC/DC converter is described in connection with an LCD display system, it may be deployed in other display systems, such as those deploying a plasma display element, an organic light emitting display or a cathode ray tube display element.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A DC/DC conversion circuit, for converting an input voltage to an output voltage, comprising:
a first charge pump circuit, converting the input voltage to a first boosted output voltage; and
a second charge pump circuit, converting the input voltage to a second boosted output voltage,
wherein the first boosted output voltage is coupled to the second charge pump circuit to control operation of the second charge pump circuit, and the second boosted output voltage is coupled to the first charge pump circuit to control operation of the first charge pump circuit.

2. The DC/DC conversion circuit as in claim 1, wherein under control of a control signal, the first boosted output voltage disables output of the second charge pump circuit or the second output voltage disables output of the first charge pump circuit.

3. The DC/DC conversion circuit as in claim 2, wherein the control signal comprises at least one clock signal.

4. The DC/DC conversion circuit as in claim 2, wherein at least the control signal comprises a first clock signal operatively coupled to the first charge pump circuit, and a second clock signal operatively coupled to the second charge pump circuit.

5. The DC/DC conversion circuit as in claim 4, wherein the first and second charge pump circuits are coupled in parallel to provide the output of the conversion circuit.

6. The DC/DC conversion circuit as in claim 4, wherein the first and second charge pump circuits each comprises a plurality of charge pump units coupled in tandem.

7. A display system, comprising:
a display element comprising a driver circuit; and
a DC/DC conversion circuit as claimed in claim 1, which is coupled to the driver circuit of the display element so as to convert the input voltage to the output voltage and to input the output voltage to the driver circuit.

8. The display system as in claim 7, wherein the display element is a liquid crystal display element, organic light emitting display element, plasma display element or cathode ray tube element.

9. The DC/DC conversion circuit as in claim 1, wherein the first and second charge pump circuits alternately output the first and second boosted voltage as the output voltage under control of a control signal.

10. The DC/DC conversion circuit as in claim 1, wherein the first charge pump circuit comprises a first switch to which the second boosted voltage is coupled to control operation of the first switch to effect control of the operation of the first charge pump circuit, and the second charge pump circuit comprises a second switch to which the first boosted voltage is coupled to control the operation of the second switch to effect control of the operation of the second charge pump circuit.

11. The DC/DC conversion circuit as in claim 10, wherein the first switch comprises is a thin film transistor having a gate to which the first boosted voltage is coupled, and the second switch comprises a thin film transistor having a gate to which the second boosted voltage is coupled.

12. The DC/DC conversion circuit as in claim 11, wherein the first switch does not require any separate driving circuit in addition to the second boosted voltage to control its operation and the second switch does not require any separate driving circuit in addition to the first boosted voltage to control its operation.

13. A DC/DC conversion circuit, for converting an input voltage to an output voltage, comprising:
a first charge pump circuit, converting the input voltage to a first boosted voltage and producing a first signal; and
a second charge pump circuit, converting the input voltage to a second boosted voltage and producing a second signal, wherein the first signal is operatively coupled to the second charge pump circuit and the second signal is operatively coupled to the first charge pump circuit;
wherein the first boosted output voltage is coupled to the second charge pump circuit to control operation of the second charge pump circuit, and the second boosted output voltage is coupled to the first charge pump circuit to control operation of the first charge pump circuit.

14. The DC/DC conversion circuit as claimed in claim 13, wherein the at least one control signal comprises a first clock signal operatively coupled to the first charge pump circuit and a second clock signal operatively coupled to the second charge pump circuit, and the second clock signal is the inverse of the first clock signal.

15. The DC/DC conversion circuit as claimed in claim 13, wherein the first and second charge pump circuits are connected in parallel.

16. The DC/DC conversion circuit as claimed in claim 14, wherein the first and second charge pump circuits each comprises a plurality of charge pump units coupled in tandem.

17. A display system, comprising:
a display element comprising a driver circuit; and
a DC/DC conversion circuit as claimed in claim 13, which is coupled to the driver circuit of the display element so as to convert the input voltage to the output voltage and to input the output voltage to the driver circuit.

18. The display system as in claim 17, wherein the display element is a liquid crystal display element, organic light emitting display element, plasma display element or cathode ray tube element.

19. The DC/DC conversion circuit as in claim 13, wherein the first signal disables output of the second charge pump circuit and the second signal disables output of the first charge pump circuit under control of a control signal.

20. The DC/DC conversion circuit as in claim 13, wherein the first and second charge pump circuits alternately output the first and second boosted voltage as the output voltage under control of a control signal.

21. The DC/DC conversion circuit as in claim 13, wherein the first charge pump circuit comprises a first switch to which the second boosted voltage is coupled to control operation of the first switch to effect control of the operation of the first charge pump circuit, and the second charge pump circuit comprises a second switch to which the first boosted voltage is coupled to control the operation of the second switch to effect control of the operation of the second charge pump circuit.

22. The DC/DC conversion, circuit as in claim 21, wherein the first switch comprises a thin film transistor having a gate to which the first boosted voltage is coupled, and the second switch comprises a thin film transistor having a gate to which the second boosted voltage is coupled.

23. The DC/DC conversion circuit as in claim 22, wherein the first switch does not require any separate driving circuit in addition to the second boosted voltage to control its operation and the second switch does not require any separate driving circuit in addition to the first boosted voltage to control its operation.

* * * * *